(12) United States Patent
Andrew et al.

(10) Patent No.: US 11,138,767 B2
(45) Date of Patent: Oct. 5, 2021

(54) SYSTEM AND METHOD FOR THE PROSCRIPTIVE DETERMINATION OF PARAMETERS FOR ITERATIVE RECONSTRUCTION

(71) Applicant: Carl Zeiss X-ray Microscopy, Inc., Pleasanton, CA (US)

(72) Inventors: Matthew Andrew, Pleasanton, CA (US); William Thompson, Pleasanton, CA (US)

(73) Assignee: Carl Zeiss X-Ray Microscopy, Inc., Pleasanton, CA (US)

( * ) Notice: Subject to any disclaimer, the term of this patent is extended or adjusted under 35 U.S.C. 154(b) by 140 days.

(21) Appl. No.: 16/361,875

(22) Filed: Mar. 22, 2019

(65) Prior Publication Data

US 2019/0311504 A1    Oct. 10, 2019

Related U.S. Application Data

(60) Provisional application No. 62/646,790, filed on Mar. 22, 2018.

(51) Int. Cl.
| G06T 11/00 | (2006.01) |
| G06T 5/00 | (2006.01) |
| G06T 5/20 | (2006.01) |
| G01N 23/046 | (2018.01) |

(52) U.S. Cl.
CPC .......... *G06T 11/006* (2013.01); *G01N 23/046* (2013.01); *G06T 5/002* (2013.01); *G06T 5/20* (2013.01); *G01N 2223/304* (2013.01); *G01N 2223/42* (2013.01); *G06T 2207/10081* (2013.01); *G06T 2207/20192* (2013.01); *G06T 2211/421* (2013.01); *G06T 2211/424* (2013.01)

(58) Field of Classification Search
CPC .......... G06T 5/002; G06T 2207/10081; G06T 2211/424; G01N 23/046
See application file for complete search history.

(56) References Cited

U.S. PATENT DOCUMENTS

| 2005/0111616 | A1* | 5/2005 | Li | G06T 11/005 378/22 |
| 2012/0014582 | A1* | 1/2012 | Schaefer | A61B 6/032 382/131 |
| 2012/0139540 | A1* | 6/2012 | Flood | D06F 39/00 324/309 |
| 2013/0077844 | A1* | 3/2013 | Vija | G06T 7/13 382/131 |
| 2014/0233692 | A1* | 8/2014 | Case | G06F 3/04842 378/5 |

(Continued)

OTHER PUBLICATIONS

Aghaei, A., et al., "Direct pore-to-core up-scaling of displacement processes: Dynamic pore network modeling and experimentation," J. Hydrol., 522: 488-509 (2015).

(Continued)

*Primary Examiner* — King Y Poon
*Assistant Examiner* — Michael Burleson
(74) *Attorney, Agent, or Firm* — HoustonHogle LLP

(57) ABSTRACT

A x-ray micro tomography system provides the ability to proscriptively determine regularization parameters for iterative reconstruction of a sample, from projection data of the sample. This allows a less experienced operator to determine the regularization parameters with adequate precision.

18 Claims, 36 Drawing Sheets

(56) References Cited

U.S. PATENT DOCUMENTS

| | | | |
|---|---|---|---|
| 2015/0243045 A1* | 8/2015 | Ra | A61B 6/032 382/131 |
| 2018/0144511 A1* | 5/2018 | Lee | G06T 11/005 |

OTHER PUBLICATIONS

Al-Khulaifi, Y., et al., "Reservoir-condition pore-scale imaging of dolomite reaction with supercritical CO 2 acidified brine: Effect of pore-structure on reaction rate using velocity distribution analysis," Int. J. Greenh. Gas Control, 68: 99-111 (2018).

AiRatrout, A., et al., "Automatic measurement of contact angle in pore-space images," Adv. Water Resour., 109: 158-169 (2017).

Andrew, M., et al. "Pore-scale contact angle measurements at reservoir conditions using X-ray microtomography," Adv. Water Resour. 68, 24-31 (2014).

Andrew, M., et al., "The Imaging of Dynamic Multiphase Fluid Flow Using Synchrotron-Based X-ray Microtomography at Reservoir Conditions," Transp. Porous Media, 110: 1-24 (2015).

Anonymous, "Backprojection Filters," https://www.clear.rice.edu/elec431/projects96/DSP/filters.html, 1-4 (1997).

Anonymous, "iDose Iterative Reconstruction Techique," Philips Healthcare, 1-40 (2011).

Berg, S., et al., "Real-time 3D imaging of Haines jumps in porous media flow," Proc. Natl. Acad. Sci., 110(10): 3755-3759 (2013).

Bertei, A., et al. "Validation of a physically-based solid oxide fuel cell anode model combining 3D tomography and impedance spectroscopy," Int. J. Hydrogen Energy, 41(47): 22381-22393 (2016).

Blunt, M.J., et al., "Pore-scale imaging and modelling," Adv. Water Resour., 51: 197-216 (2013).

Boas, F.E., et al., "CT artifacts: causes and reduction techniques," Imaging Med., 4 (2): 229-240 (2012).

Deak, Z., et al., Filtered Back Projection, Adaptive Statistical Iterative Reconstruction, and a Model-Based Iterative Reconstruction in Abdominal CT: An Experimental Clinical Study, Radiology, 266(1): 197- 206 (2013).

Feldkamp, L.A., et al., "Practical cone-beam algorithm," J. Opt. Soc. Am. A/1(6): 612-619 (1984).

Gao, Y., et al., "X-ray Microtomography of Intermittency in Multiphase Flow at Steady State Using a Differential Imaging Method," Water Resour. Res., 53: 10274-10292 (2017).

Giirsoy, D., et al., "TomoPy: a framework for the analysis of synchrotron tomographic data," J. Synchrotron Radiat., 21(Pt 5): 1188-1193 (2014).

Hammer, M., "CT Physics: CT Reconstruction and Helical CT," http://xrayphysics.com/ctsim.html, 1-6 (2014).

Hayden, B.F., "Slice Reconstruction," http://homepages.infed.ac.uk/rbf/CVonline/LOCAL_COPIES/AV0405/HAYDEN/Slice_Reconstruction.html, 1-4 (2005).

Huber, P.J., "Robust Estimation of a Location Parameter," Ann. Math. Stat., 35: 73-101 (1964).

Hudson, H.M., et al., "Accelerated image reconstruction using ordered subsets of projection data," IEEE Trans. Med. Imaging, 13: 100-108 (1994).

Jorgensen, J.S., et al., "How little data is enough? Phase-diagram analysis of sparsity-regularized X-ray computed tomography," Philos. Trans. R. Soc. A Math. Phys. Eng. Sci., 373: 20140387-20140387 (2015).

Jorgensen, J.S., et al., "Quantifying Admissible Undersampling for Sparsity-ExploitingIterative Image Reconstruction in X-Ray CT," IEEE Trans. Med. Imaging, 32(2): 460-473 (2013).

Jorgensen, J.S., et al., "SparseBeads data: benchmarking sparsity-regularized computed tomography," Meas. Sci. Technol., 28: 124005 (2017).

Kazantsev, D., et al. "4D-CT reconstruction with unified spatial-temporal patch-based regularization," Inverse Probl. Imaging, 9(2): 447-467 (2015).

Kazantsev, D., et al., "Temporal sparsity exploiting nonlocal regularization for 4D computed tomography reconstruction," J. Xray. Sci. Technol., 24: 207-219 (2016).

Ketcham, R.A., et al., "Acquisition, optimization and interpretation of x-ray computed tomographic imagery: Applications to the geosciences," Comput. Geosci., 27: 381-400 (2001).

Lin, Q., et al., "Multi-scale quantification of leaching performance using X-ray tomography," Hydrometallurgy, 164: 265-277 (2016).

Lin, Q., et al., "Visualization and quantification of capillary drainage in the pore space of laminated sandstone by a porous plate method using differential imaging X-ray microtomography," Water Resour. Res., 53: 7457-7468 (2017).

Maire, E., et al., "Quantitative X-ray tomography," Int. Mater. Rev., 59: 1-43 (2014).

Myers, G.R., et al., "Bayesian approach to time resolved tomography," Opt. Express, 23(15): 20062-20074 (2015).

Nesterov, Y., "A Method of Solving a Convex Programming Problem With Convergence rate $O(1/k^2)$," Sov. Math. Dokl., 27(2): 372-376 (1983).

Pan, A., "Tomographic Image Reconstruction," 41st Annumal Meeting AAPM, 1-10 (1999).

Pan, X., et al., "Why do commercial CT scanners still employ traditional, filtered back-projection for image reconstruction?" Inverse Probl., 25(12): 1-50, 123009 (2009).

Puncreobutr, C., et al., "Quantitative 3D Characterization of Solidification Structure and Defect Evolution in Al Alloys," JOM, 64: 89-95 (2012).

Reynolds, C.A., et al. "Dynamic fluid connectivity during steady-state multiphase flow in a sandstone," Proc. Natl. Acad. Sci., 114(31): 8187-8192 (2017).

Robinson, J.B., et al., "A novel high-temperature furnace for combined in situ synchrotron X-ray diffraction and infrared thermal imaging to investigate the effects of thermal gradients upon the structure of ceramic materials," J. Synchrotron Radiat., 21: 1134-1139 (2014).

Saif, T., et al., "Dynamic imaging of oil shale pyrolysis using synchrotron X-ray microtomography," Geophys. Res. Lett., 43: 6799-6807 (2016).

Saif, T., et al., "Multi-scale multi-dimensional microstructure imaging of oil shale pyrolysis using X-ray micro-tomography, automated ultra-high resolution SEM, MAPS Mineralogy and FIB-SEM.," Appl. Energy, 202: 628-647 (2017).

Schlüter, S. et al., "Image processing of multiphase images obtained via X-ray microtomography: A review," Water Resour. Res., 50: 3615-3639 (2014).

Sidky, E.Y., et al., "Image reconstruction in circular cone-beam computed tomography by constrained, total-variation minimization," Phys. Med. Biol., 53(17): 4777-4807 (2008).

Singh, K., et al., "Dynamics of snap-off and pore-filling events during two-phase fluid flow in permeable media," Sci. Rep., 7: 5192, 1-13 (2017).

Stock, S.R., "Recent advances in X-ray microtomography applied to materials," Int. Mater. Rev., 53(3): 129-181 (2008).

Thibault, J.-B., et al., "A Three-Dimensional Statistical Approach to Improve Image Quality for Mutlislice Helical CT," Med. Phys., 34(11): 4526-4544 (2007).

Turbell, H., "Cone-Beam Reconstruction Using Filtered Backprojection," Science and Technology, v-177 (2001).

Uriol, M.C.V., "Reconstruction from Projections," Computational Imaging Lab, 1-30 (2007).

van Aarle, W., et al., "Fast and flexible X-ray tomography using the ASTRA toolbox," Opt. Express, 24: 25129 (2016).

Van Eyndhoven, G., et al., "An Iterative CT Reconstruction Algorithm for Fast Fluid Flow Imaging," IEEE Trans. Image Process., 24: 1-13 (2015).

Zeng, G.L., et al., "Unmatched projector/backprojector pairs in an iterative reconstruction algorithm," IEEE Trans. Med. Imaging, 19(5): 548-555 (2000).

* cited by examiner

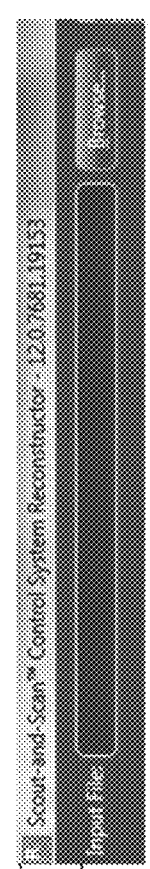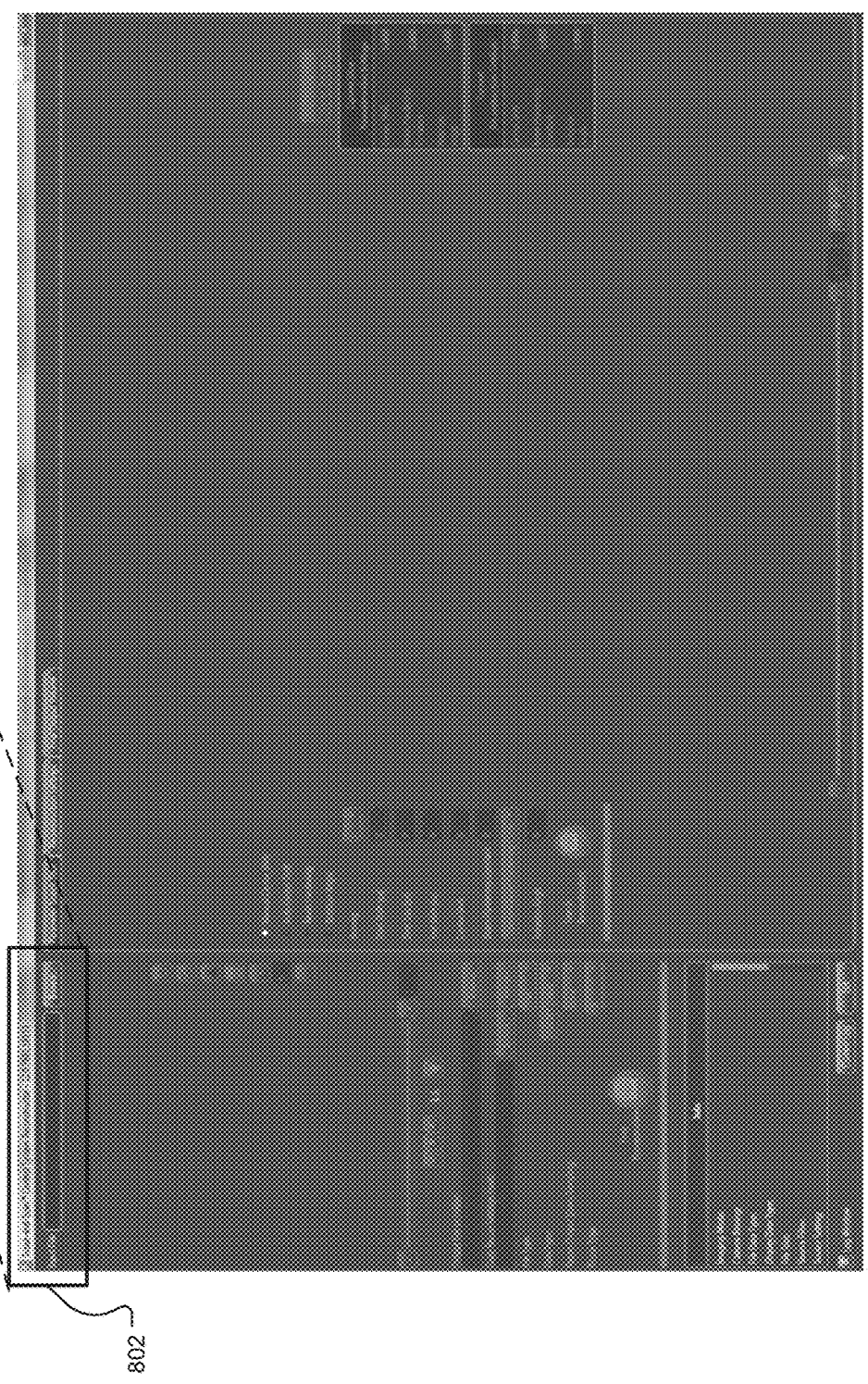

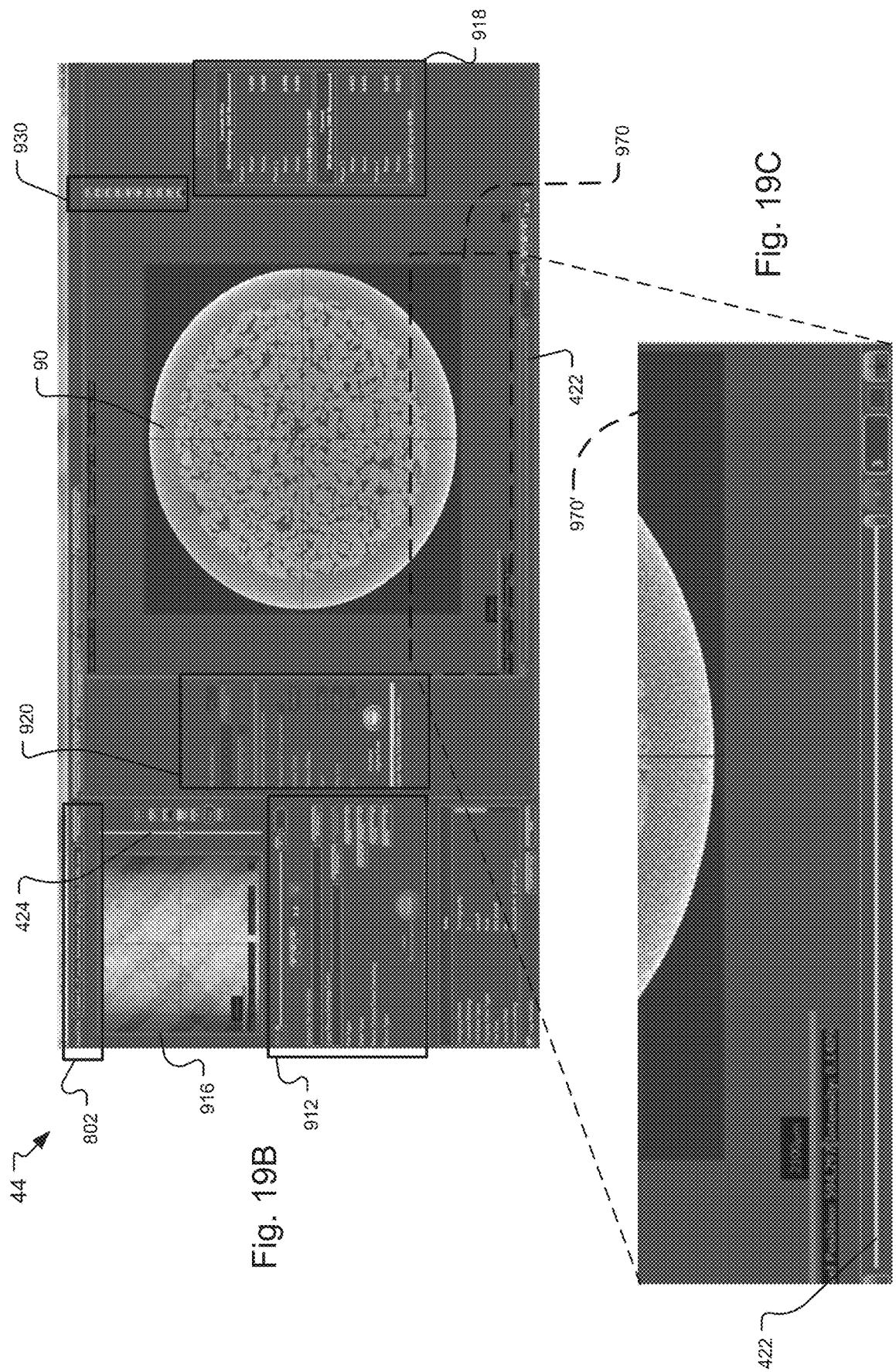

SYSTEM AND METHOD FOR THE PROSCRIPTIVE DETERMINATION OF PARAMETERS FOR ITERATIVE RECONSTRUCTION

RELATED APPLICATIONS

This application claims the benefit under 35 USC 119(e) of U.S. Provisional Application No. 62/646,790, filed on Mar. 22, 2018, which is incorporated herein by reference in its entirety.

BACKGROUND OF THE INVENTION

X-ray micro tomography systems provide high-resolution, non-destructive imaging of internal structures in samples. The systems are utilized in a variety of industrial and research applications, such as materials science, clinical research, and failure analysis, in examples. The systems provide the ability to visualize features in samples without the need to cut and slice the samples. X-ray micro tomography systems include x-ray projection systems that produce projection data of the sample, and computer systems that reconstruct tomographic images of the sample from the projection data.

In an x-ray micro tomography system, the x-ray projection system executes a scan of a sample at different angles to produce the projection data. During a scan, x-rays are directed to the sample, and are absorbed or scattered by the sample as the x-rays travel through the sample. The x-rays not absorbed or scattered away are transmitted through and modulated by the sample. A detector system receives the transmitted x-rays, and creates an image representation, in pixels, of the received x-rays. The image representation of the received x-rays at the detector system is known as an x-ray projection. The series of x-ray projections at different angles produced from the scan form the projection data of the sample.

The computer system of the x-ray micro tomography system accesses the projection data, and applies image reconstruction modalities to the projection data to reconstruct slices and volume datasets of the sample. A slice is a two dimensional (2D) cross-sectional image of the sample, and a volume dataset is a three dimensional (3D) representation of the entire sample.

The most commonly used algorithm for analytical reconstruction is filtered back projection (FBP). In FBP, each slice of the sample is typically created in a single reconstruction step. A filter is typically applied to remove blur from the projections in the projection data, and the filtered projections are back-projected to create each slice.

Iterative reconstruction is another approach that reconstructs slices from successive estimates of the projection data forming each slice. Multiple iterations of the estimated projection data for each slice are executed for this purpose. During each iteration, the estimated projection data are compared to the actual (e.g. measured) projection data. The result of each comparison is used to make corrections to the current estimate, thereby creating a new estimate of the projection data. When the estimated projection data no longer require corrections, a volume dataset is reconstructed from the estimated projection data. Exemplary iterative reconstruction algorithms include algebraic reconstruction technique (ART), simultaneous reconstruction technique (SIRT) and iterative least-squares technique (ILST). The algorithms typically differ in the way the measured and estimated projection data are compared and the kind of correction applied to the current estimate.

Iterative reconstruction requires the operator to select regularization parameters. The regularization parameters directly affect image characteristics of the slices and/or volume datasets reconstructed from the projection data. The image characteristics include spatial resolution, visibility of detail, and contrast, in examples. Of the regularization parameters, an edge preservation cutoff regularization parameter and a smoothing regularization parameter are typically the most important.

Analytical reconstruction and iterative reconstruction modalities have advantages and disadvantages. FBP provides good image quality with relatively low processing overhead, which increases throughput and reduces cost. A disadvantage of FBP is susceptibility to image noise in the projection data. Advantages of iterative reconstruction include generally improved image quality, less susceptibility to image noise, and the ability to reconstruct an optimal image in the case of incomplete projection data. Disadvantages of iterative reconstruction include complexity associated with selection of regularization parameters applied to the iterative reconstruction algorithm, longer processing time, and increased computational cost.

SUMMARY OF THE INVENTION

Iterative reconstruction has the potential of greatly increasing reconstruction quality. However, the performance of the reconstruction is highly dependent on the selection of the regularization parameters (e.g. edge preservation and smoothing regularization parameters) provided to the reconstruction algorithm, the selection of which is complex and requires expert skill and knowledge. Because the selection of these regularization parameters is challenging for non-expert users, wider adoption of iterative reconstruction as an image reconstruction modality has generally been limited.

It is therefore an object of the present invention to make iterative reconstruction easier such as for the average/non-expert operator. For this purpose, a proposed x-ray tomography system provides the ability to proscriptively determine regularization parameters for iterative reconstruction of a sample, from projection data of the sample. Using the proposed x-ray tomography system, the less experienced operator can determine the regularization parameters with minimal interaction between the x-ray tomography system and the operator.

The operator uses the x-ray tomography system to determine regularization parameters such as a center offset, a beam hardening correction constant, an edge preservation cutoff parameter, and a smoothing parameter. The operator can then execute an iterative reconstruction of the sample using the projection data and the determined regularization parameters to create a volume dataset of the sample.

In general, according to one aspect, the invention features an x-ray tomography system. The x-ray tomography system includes an x-ray microscopy system including an x-ray source system for generating an x-ray beam and a detector system for detecting the x-ray beam after transmission through a sample to generate projection data and a computer system for executing iterative reconstruction using the projection data by first determining regularization parameters.

In the preferred embodiment, the computer system estimates image noise from a reconstructed portion of the sample and sets an edge preserving cutoff regularization parameter based on the noise estimate. This edge preserving cutoff regularization parameter is used in the iterative reconstruction using the projection data. Preferably, the reconstructed portion of the sample is reconstructed using back projection and the noise is estimated within different phases of the sample, such as by measuring standard deviations of pixel greyscales within each of the phases.

In embodiments, the computer system reconstructs at least a portion of the sample using iterative reconstruction using different smoothing regularization parameters until a target signal to noise ratio is obtained. The smoothing regularization parameter that yields the target signal to noise ratio is then used in the iterative reconstruction using the projection data.

The computer system can determine a center offset regularization parameter based on a reconstruction of at least a portion of the sample using back projection. In addition, the computer system can determine a beam hardening correction constant regularization parameter based on a reconstruction of at least a portion of the sample using back projection.

In a preferable operation, a setup method is performed to determine a corrected beam hardening correction constant and a corrected center offset based on a reconstruction of at least a portion of the sample using Filtered Back Projection (FBI)).

In general, according to one aspect, the invention features method for an x-ray micro tomography system. This method comprises generating an x-ray beam, detecting the x-ray beam after transmission through the sample to generate projection data, and a computer system executing iterative reconstruction using the projection data by first determining regularization parameters.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 8A illustrates a screen of the GUI of the reconstruction application;

FIG. 8B is a magnified view of the GUI in FIG. 8B, showing details of a file browser widget for collecting projection data of a sample stored within a file;

FIG. 19B shows the GUI after executing another iterative reconstruction of the sample using different reconstruction settings, where the scan parameters of the settings were increased by an order of magnitude, and where the contrast of a displayed slice selected from the reconstruction indicates that the settings have likely yielded an improper "oversmoothed" value of the smoothing regularization parameter;

FIG. 19C is a magnified view of the GUI, showing details of an portion of the slice displayed in FIG. 19B;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
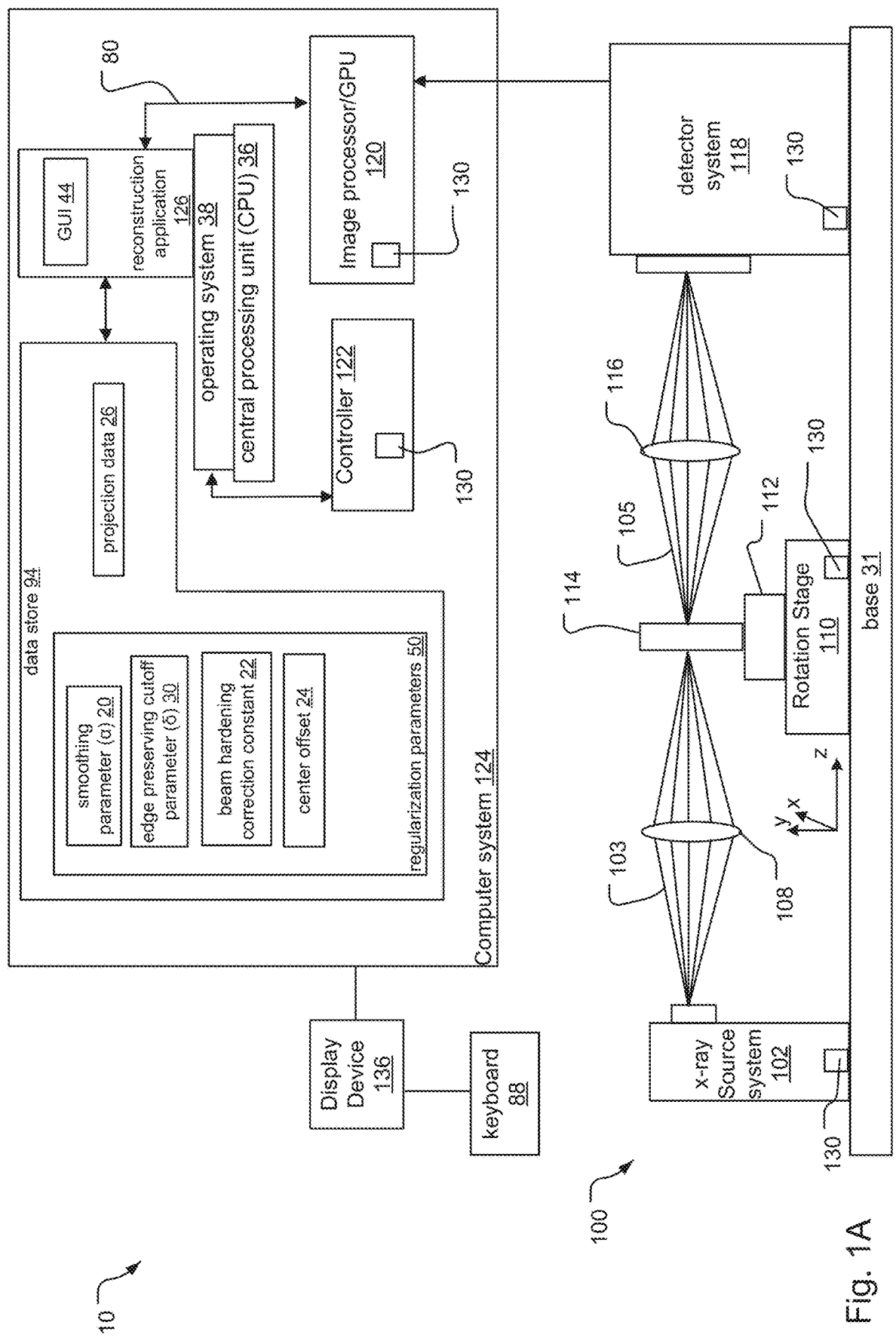
FIG. 1A is a side view of an x-ray micro tomography system including a lens-based x-ray microscopy system, according to an embodiment of the present invention, where the x-ray microscopy system generates x-ray projection data of a sample, and where a reconstruction application that resides within a computer system of the x-ray tomography system generates 2D and 3D image reconstructions of the sample from the projection data.

FIG. 1A shows an embodiment of an x-ray micro tomography system 10. Major components of the system 10 include a lens-based x-ray microscopy system 100 ("lens-based system") and a computer system 124. The x-ray microscopy system 10 generates x-ray projection data 26 of a sample 114.

The x-ray microscopy system 100 includes an x-ray source system 102 for generating an x-ray beam, and a detector system 118 for detecting the x-ray beam after transmission through the sample 114 to generate the projection data 26. The computer system 124 executes iterative reconstruction using the projection data 26 by first determining regularization parameters 50.

The lens-based system 100 has an x-ray source system 102 that generates an x-ray beam 103 and a rotation stage 110 with sample holder 112 for holding the sample 114. A condenser 108 placed between the x-ray source system 102 and the sample 114 focuses the x-ray beam 103 onto the sample 114.

The lens-based system 100 also has a detector system 118, and an objective lens 116 placed between the sample 114 and the detector system 118. When the sample 114 is exposed to the x-ray beam 103, the sample 114 absorbs and transmits x-ray photons associated with the x-ray beam 103. The x-ray photons transmitted through the sample 114 form an attenuated x-ray beam 105, which the objective lens 116 images onto the detector system 118. The detector system 118, the rotation stage 110, and the x-ray source system are mounted to a base 31.

The detector system 118 creates an image representation, in pixels, of the x-ray photons from the attenuated x-ray beam 105 that interact with the detector system 118. The image formed at the detector system 118 is also known as an x-ray projection, or an x-ray projection image.

The computer system 124 has various components. These components include a data store 94 for storing the projection data 26 and the regularization parameters 50, an operating system 38, a central processing unit (CPU) 36, an image processor 120, a controller 122, and a reconstruction application 126. The reconstruction application 126 includes a graphical user interface (GUI) 44.

A display device 136 connected to the computer system 124 displays information for managing and operating the system 10. The display device 136 presents the GUI 44, and an operator interacts with the system 10 via the GUI 44 and one or more input devices. A keyboard 88 as an exemplary input device is shown. Another input device is a touch screen integrated within the display device 136.

The computer system 124 loads information from, and saves information to the data store 94. The controller 122 has a controller interface 130 that allows an operator to control and manage components in the lens-based system 100 under software control via the computer system 124.

Operators utilize the reconstruction application 126, via its GUI 44, to configure and manage components in the lens-based system 100 via the controller 122. The controller 122 controls components that have a controller interface 130. Components which have a controller interface 130 include the image processor 120, the detector system 118, the rotation stage 110, and the x-ray source system 102, in one implementation.

The reconstruction application 126 runs on top of the operating system 38. The operating system 38, in turn, is executed by the CPU 36. The operating system 38 is also in communication with the controller 122.

Via the GUI 44, the operator defines scanning parameters that enable the reconstruction application 126 to initiate a scan of the sample 114. These scanning parameters include parameters associated with known x-ray absorption coefficients for compounds in the sample 114, and settings for the x-ray source 102 such as an x-ray voltage setting, exposure time, and the field of view of the x-ray beam 103 incident upon the sample 114. Additional settings include the number of x-ray projection images or slices to create for the sample 114, and the angles to rotate the rotation stage 110 for rotating the sample 114 in the x-ray beam 103.

During a scan, the image processor 120 receives and processes each projection from the detector system 118. This communication is indicated by reference 80. The reconstruction application 126 saves the projections from the image processor 120 as projection data 26. The computer system 124 saves the projection data 26 from each scan, and their associated scanning parameters and settings, to the data store 94.

Also via the GUI 44, the operator defines settings that enable the reconstruction application 126 to reconstruct 2D and 3D images of the sample 114 from the projection data 26 of the sample 114. These settings include regularization parameters 50, and a number of reconstructions to create during the reconstructions, in examples.

Different regularization parameters 50 are typically used in analytical reconstructions (e.g. FBP) and in iterative reconstructions of the sample 114 from the projection data. Analytical reconstructions use regulation parameters 50 including a center offset 24 and a beam hardening correction constant 22. Iterative reconstructions use regularization parameters including corrected versions of the center offset 24 and the beam hardening correction constant 22, and also use an edge preserving cutoff parameter 30 and a smoothing parameter 20.

Figure 1B:
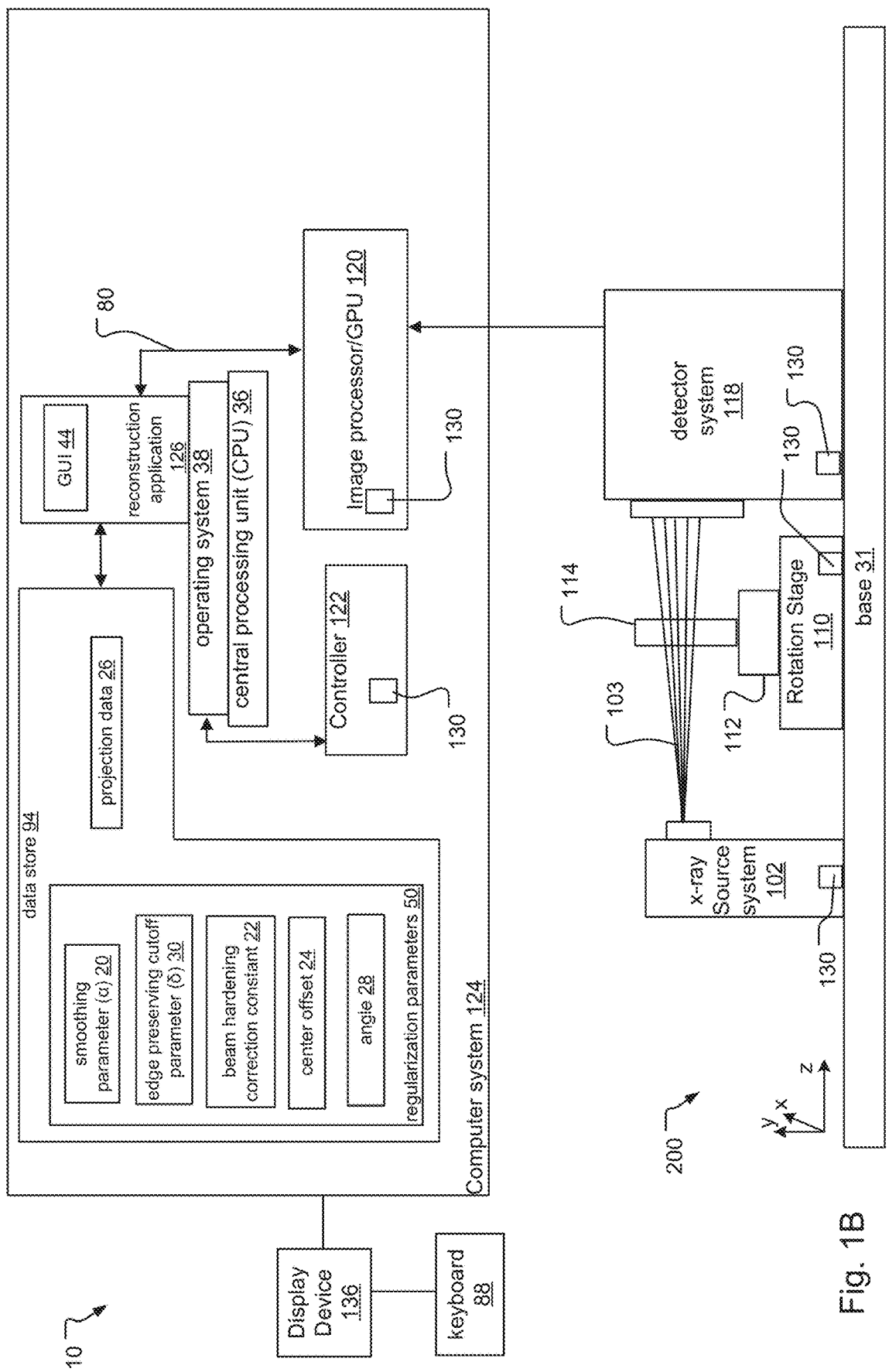
FIG. 1B is a schematic side view of an x-ray micro tomography system including a projection-based x-ray microscopy system, according to another embodiment.

FIG. 1B shows another embodiment of an x-ray micro tomography system 10. The system 10 includes a projection-based x-ray microscopy system 200 and a computer system 124. The projection-based system 200 is similar in structure to the lens-based system 100 of FIG. 1A and has nearly identical behavior but is typically lower performance in terms of magnification levels.

The projection-based system 200 eliminates the condenser 108 and objective lens 116 of the lens-based system 100. Otherwise, the projection-based system 200 has the same components as the lens-based system 100, and operators utilize the projection-based system 200 and its components in an identical fashion to the lens-based system 100 for creating x-ray projections and reconstructed 2D and 3D images of the sample 114.

The projection-based system 200 does not rely on lenses to create a magnified transmission image of the sample 114. Instead it creates a magnified point projection image of the sample 114 by geometric magnification utilizing a small x-ray source spot of the x-ray source 102 projected on the detector system 118. The magnification is achieved by positioning the sample 114 close to the x-ray source 102, in which case the resolution of the projection based system 200 is limited by the spot size of the x-ray source. A magnified projection image of the sample 114 is formed on the detector system 118.

Otherwise, the system f FIG. 1B has similar components and operates in substantially the same way as the system 10 in FIG. 1A.

Figure 2:
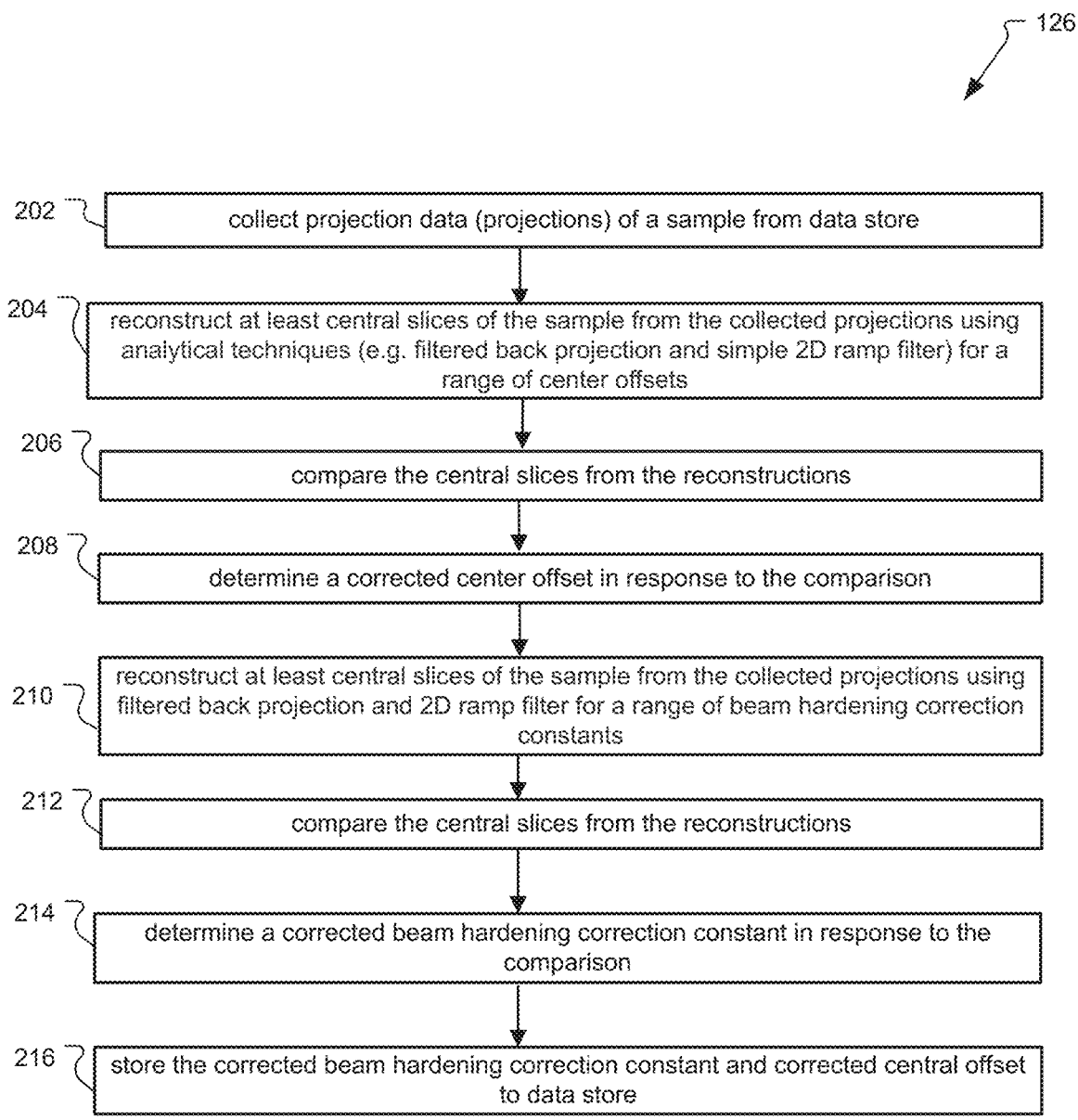
FIG. 2 is a flow diagram for a setup method of the reconstruction application, where the method determines a corrected version of a beam hardening correction constant regularization parameter and a corrected version of a center offset regularization parameter from reconstructed portions of the sample using FBP.

FIG. 2 is a flow chart for a setup method of the reconstruction application 126.

Here, the setup method determines a corrected beam hardening correction constant 22 and a corrected center offset 24 based on a reconstruction of at least a portion of the sample 114 using Filtered Back Projection (FBP).

In step 202, the reconstruction application 126 collects projection data (projections of a sample 114 from the data store 94. In one implementation, an operator selects the projection data 26 to use via the GUI 44, and the GUI passes the projection data 26 to the application 126.

In step 204, the application 126 reconstructs at least central slices of the sample from the collected projections 26 using analytical techniques (e.g. filtered back projection and simple 2D ramp filter) for a range of center offsets.

According to step 206, the application 126 compares the central slices from the reconstructions. Then, in step 208, the application 126 determines a corrected center offset 24 in response to the comparison.

In step 210, the application 126 reconstructs at least central slices of the sample from the collected projections 26 using filtered back projection and 2D ramp filter for a range of beam hardening correction constants, and compares the central slices from the reconstructions in step 212. In step 214, the application 216 determines a corrected beam hardening correction constant 22 in response to the comparison. Then, in step 216, the application 126 stores the corrected beam hardening correction constant 22 and corrected center offset 24 to the data store 94.

Figure 3:
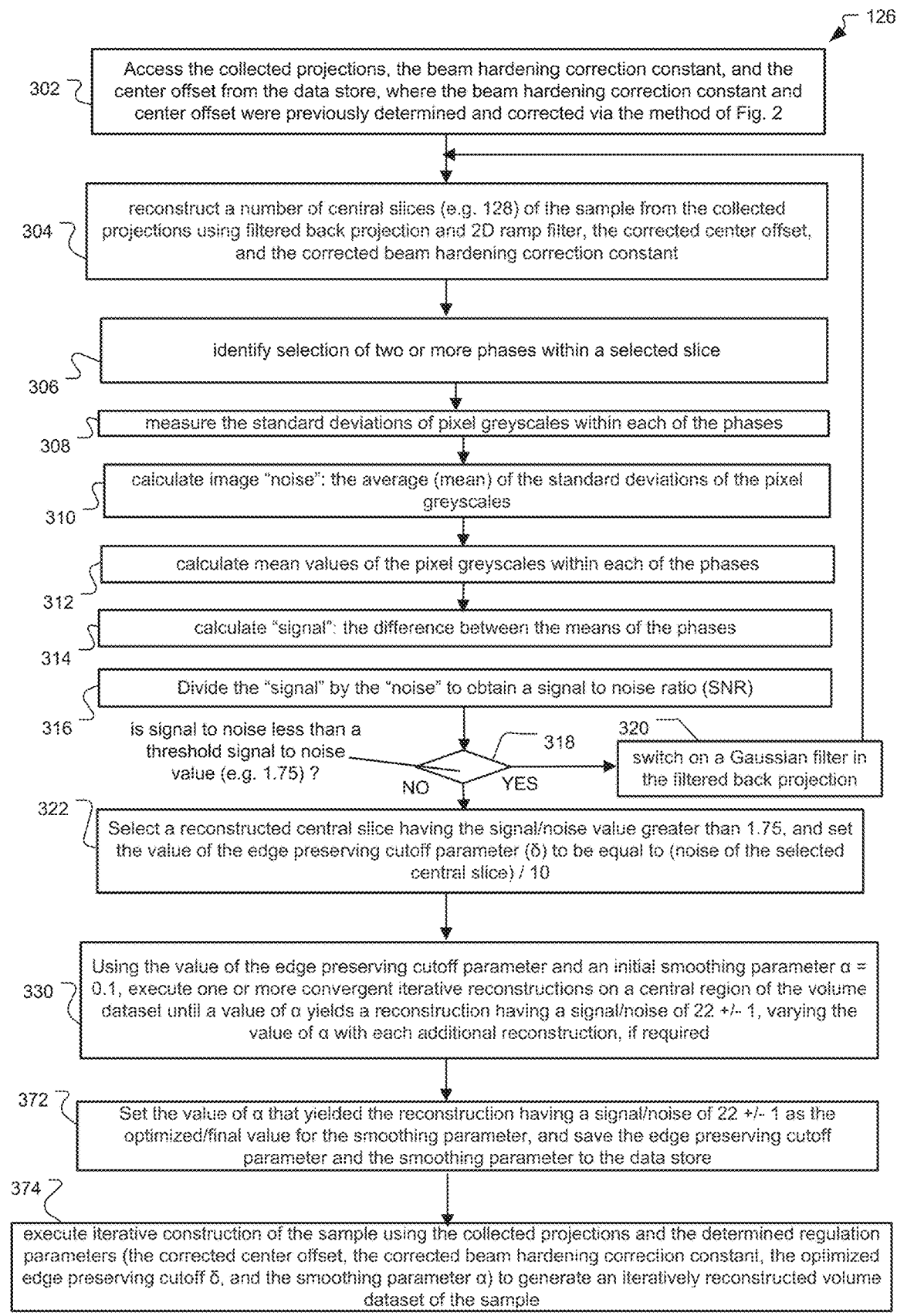
FIG. 3 is a flow diagram for another method of the reconstruction application, where the method describes how the reconstruction application determines an edge preserving cutoff regularization parameter and a smoothing regularization parameter, and then executes an iterative reconstruction using the projection data and the determined regularization parameters (the beam hardening correction constant, the center offset, the edge preserving cutoff parameter, and the smoothing parameter) to generate a volume dataset of the sample.

The method "corrects" the beam hardening correction constant 22 and center offset 24 for subsequent use as regularization parameters 50 in the method of FIG. 3.

FIG. 3 is a flow chart showing how the reconstruction application 126 determines values for the edge preserving cutoff regularization parameter 30 and the smoothing regularization parameter 20. For this purpose, the method uses the beam hardening correction constant 22 and center offset 24 previously calculated in the method of FIG. 2.

Via the reconstruction application 126 and the GUI 44, the computer system 124 estimates image noise from a reconstructed portion of the sample 114, and sets/determines the edge preserving cutoff regularization parameter 30 based upon the noise estimate. When estimating the image noise, the reconstructed portion of the sample 114 includes one or more reconstructed slices 90 of the sample 114 that are preferably reconstructed using FBP. The method begins in step 302.

In step 302, the application 126 accesses the collected projections 26, the beam hardening correction constant 22, and the center offset 24 from the data store 94. The beam hardening correction constant 22 and center offset 24 were previously determined and corrected via the method of FIG. 2. In one implementation, an operator selects the projection data 26, the beam hardening correction constant 22, and the center offset 24 via the GUI 44, and the GUI 44 passes the projection data 26 to the application 126.

According to step 304, the application 126 reconstructs a number of central slices of the sample 114 from the collected projections 26 using filtered back projection and 2D ramp filter, the corrected center offset 24, and the corrected beam hardening correction constant 22. In one example, the number of slices reconstructed is 128. However, fewer or more slices could also be reconstructed.

Projection data 26 of a sample often includes many hundreds or a few thousands of slices. However, experimentation has shown that the FBP-based reconstruction in step 304 does not need to be executed over the entire sample 114/entire number of slices. Rather, the FBP-based reconstruction can be executed on a portion of the sample 114/subset of the slices, such as using only 128 slices. Such a subset of the slices passed to the FBP algorithm is sufficient for subsequent determination of the edge preserving cutoff parameter 30.

Typically, the FBP-based reconstruction in step 304 is also executed without performing post-filtering of the reconstructed slices.

Figure 12A:
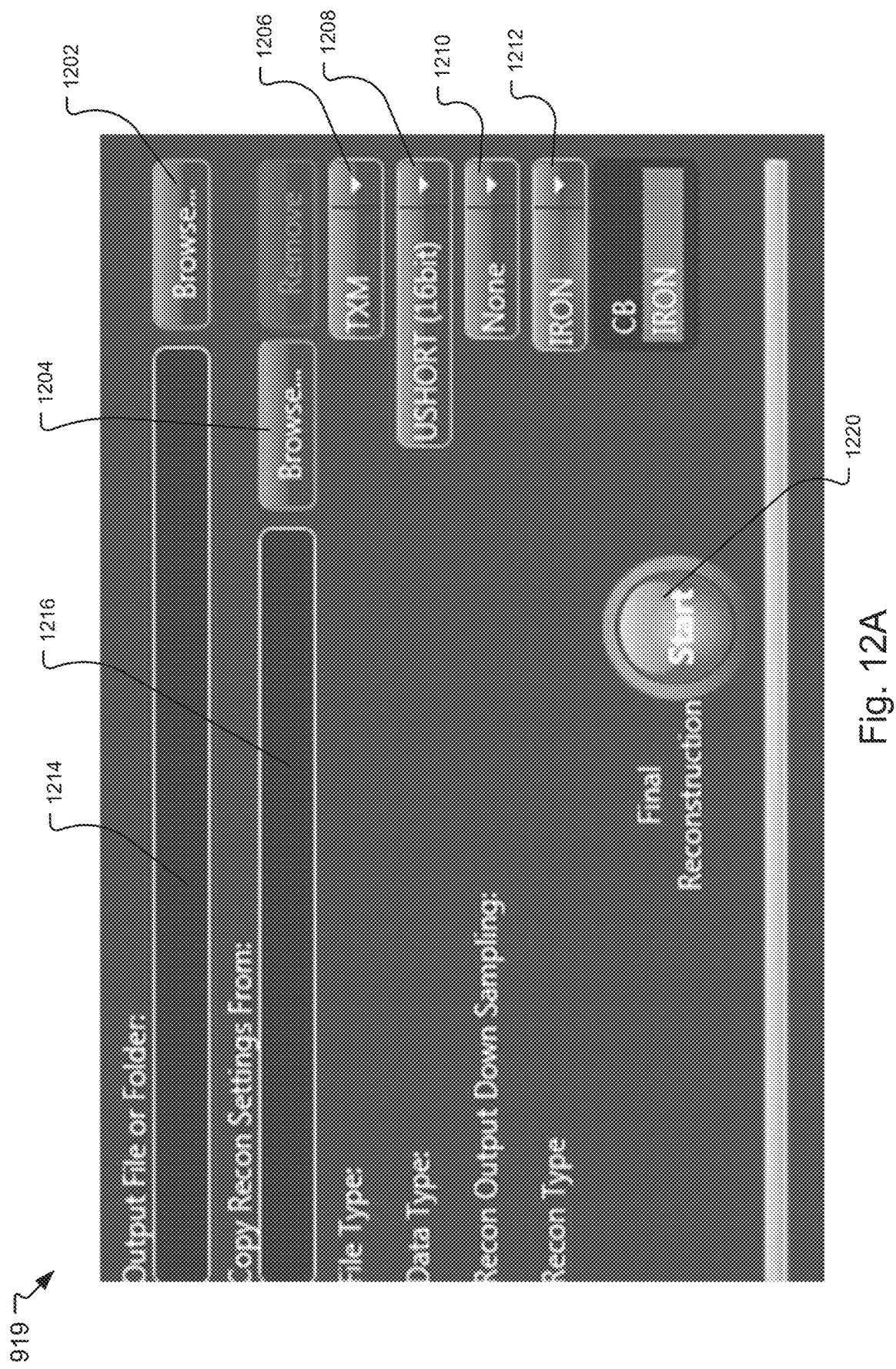
FIG. 12A is a magnified view of the GUI, showing details of a Reconstruction Manager window for managing reconstructions and executing a final reconstruction of the sample.
Figure 12B:
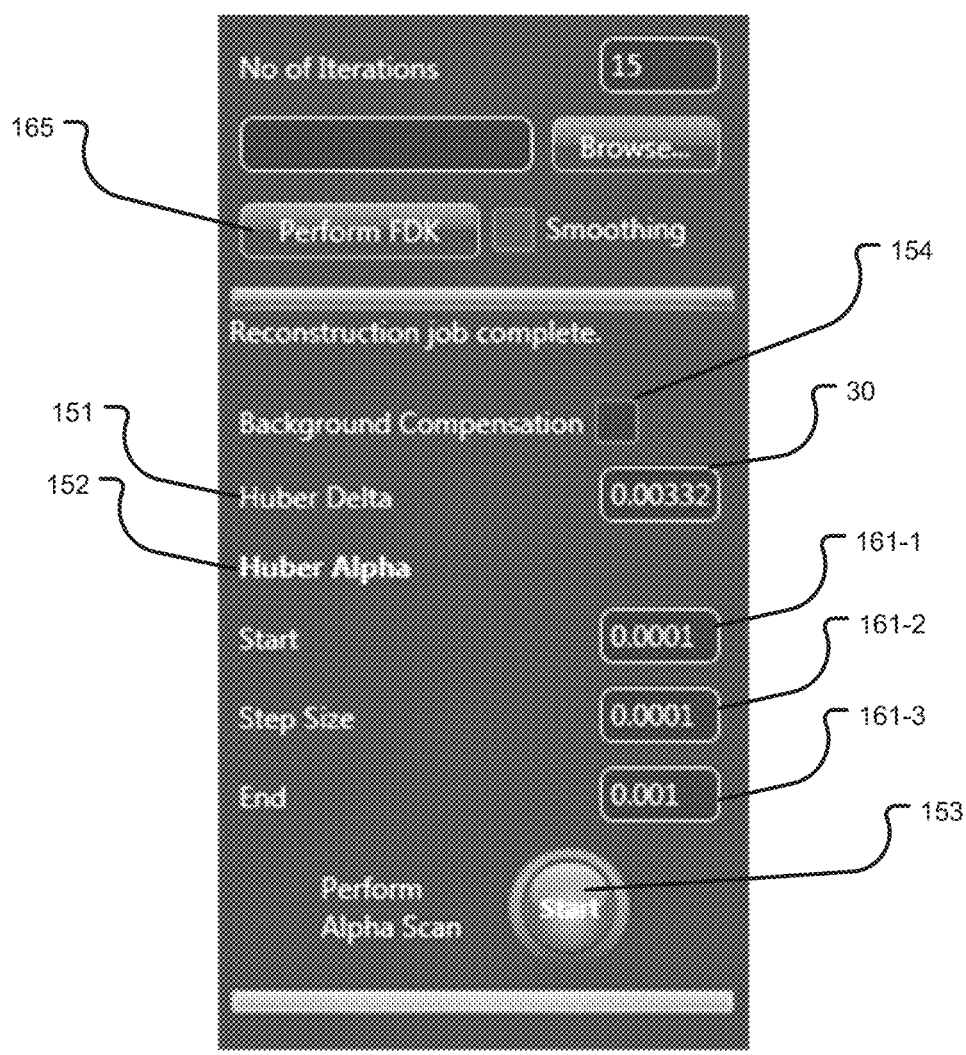
FIG. 12B is a magnified view of the GUI, showing details of an Intermediate Reconstruction window for executing a FBP or an alpha scan.
Figure 13A:
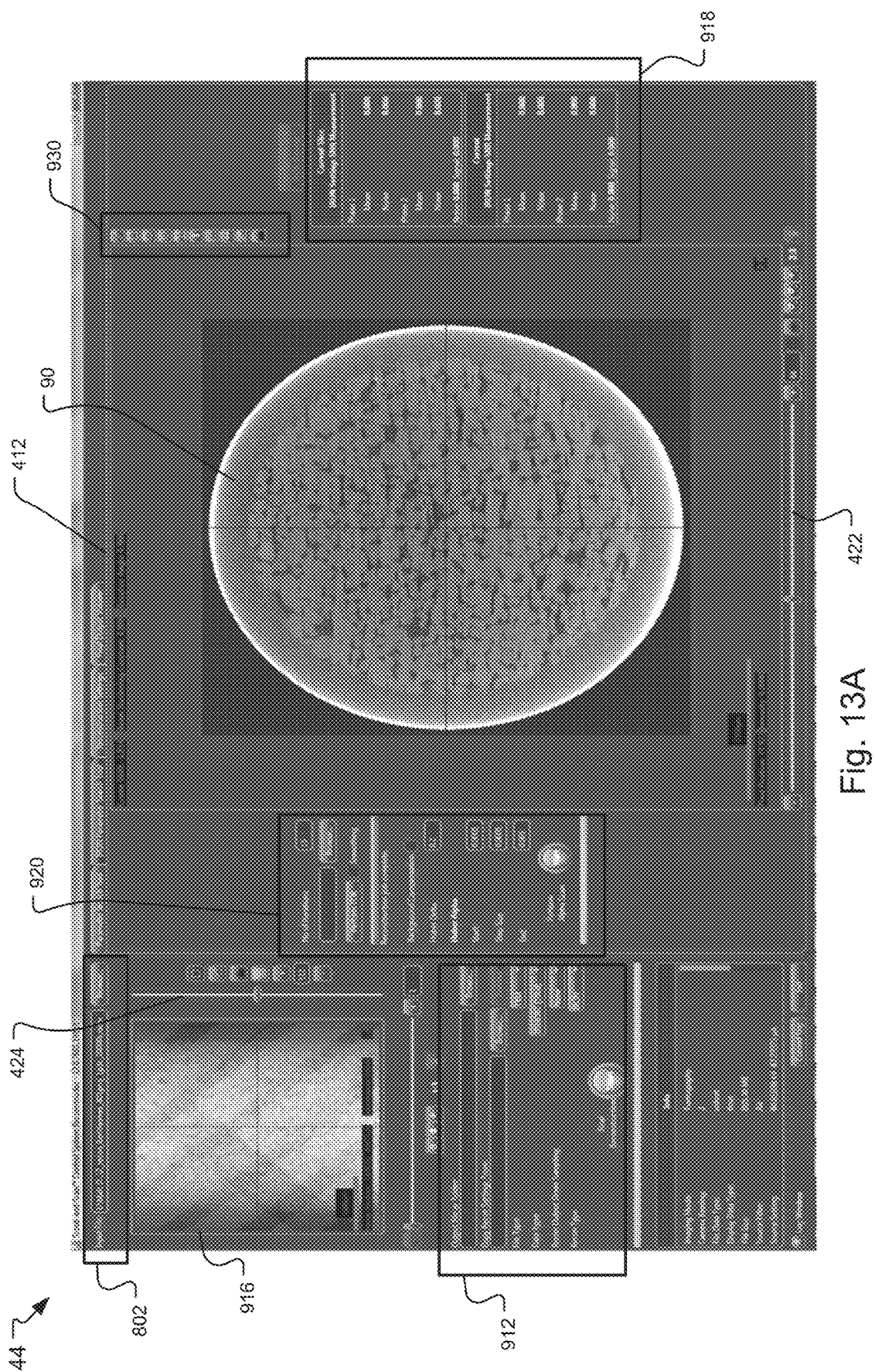
FIG. 13A shows the GUI, and displays a slice selected by the operator from an FBP reconstruction of the sample created via the Intermediate Reconstruction window of FIG. 12A, where the slice is selected for determining the edge preservation cutoff regularization parameter.
Figure 13B:
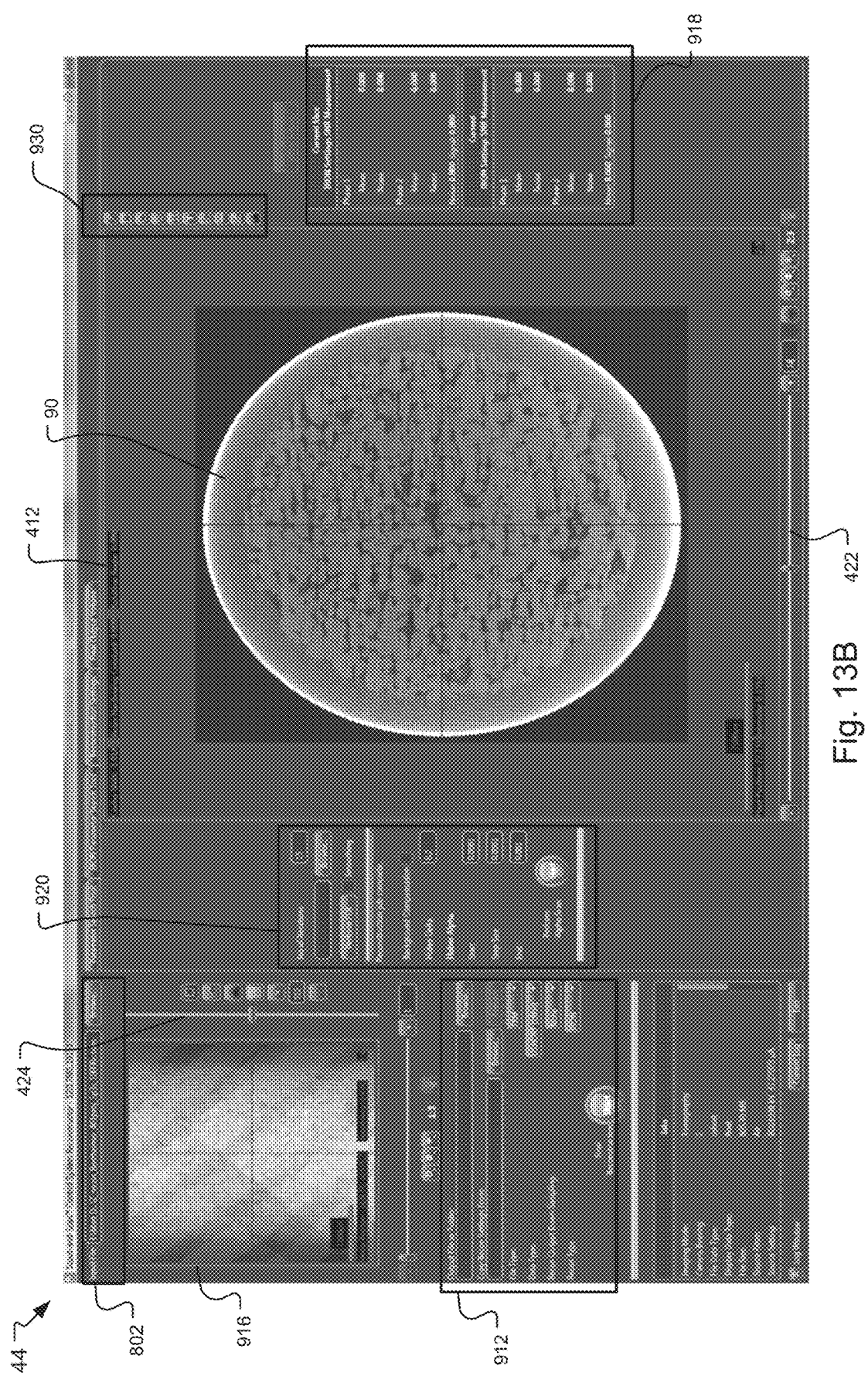
FIG. 13B shows the GUI as in FIG. 13A and displays a different slice selected from the reconstructed central slices of the sample.

In one implementation, step 304 is reached and executed in response to the operator using the Perform FBP window 912 of FIG. 12 to initiate the reconstruction. The description of FIG. 12 is included hereinbelow.

To determine the edge preserving cutoff regularization parameter 30, the operator directs the computer system 124 to create a reconstructed portion of the sample 114 using FBP. Then, the operator is typically required to select two or more different phases of the sample 114 from a reconstructed portion of the sample 114, such as from a representative reconstructed central slice.

The computer system 124 estimates the noise within the different phases of the sample using statistical analysis, and sets a value for edge preserving cutoff regularization parameter 30 based upon the noise estimate. For this purpose, the computer system 124 calculates a signal to noise ratio for each reconstructed slice. When the computer system identifies a reconstructed slice that meets or exceeds the target signal to noise ratio, the computer system 124 sets the edge preserving cutoff regularization parameter 30 to be the noise of the reconstructed slice having the target signal to noise ratio.

Figure 14:
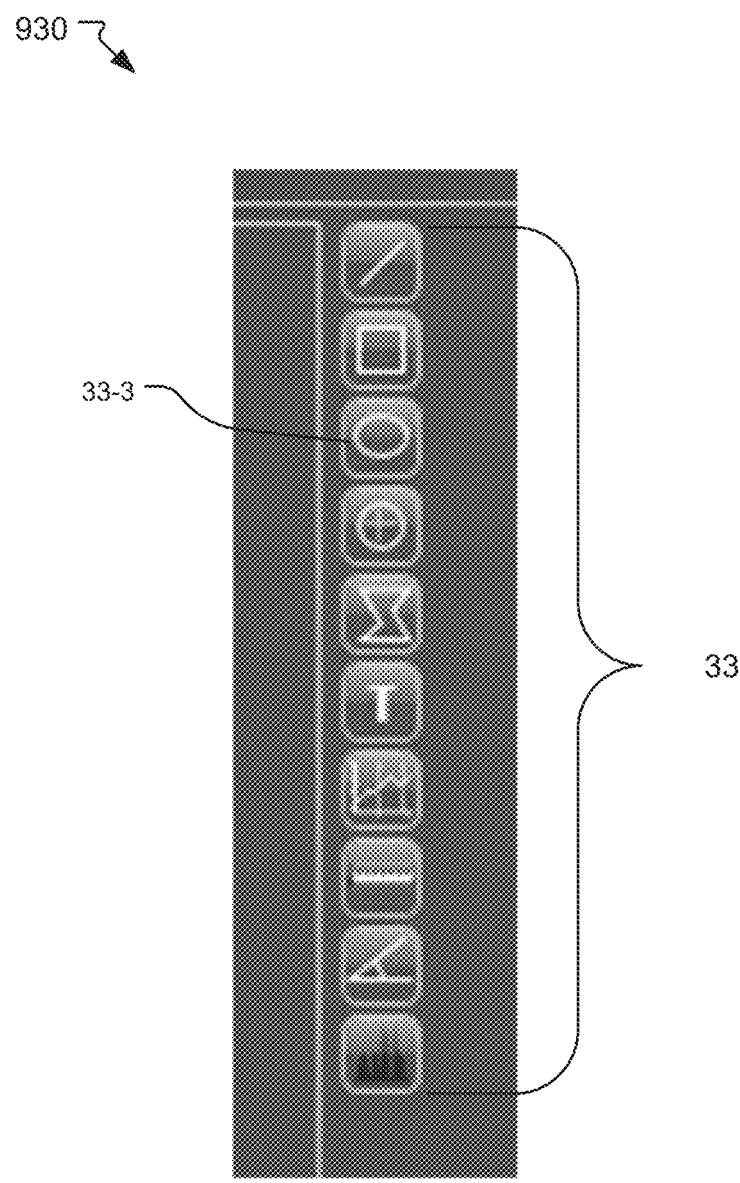
FIG. 14 is a magnified view of the GUI, showing details of an Annotation and Analysis Tool.
Figure 15A:
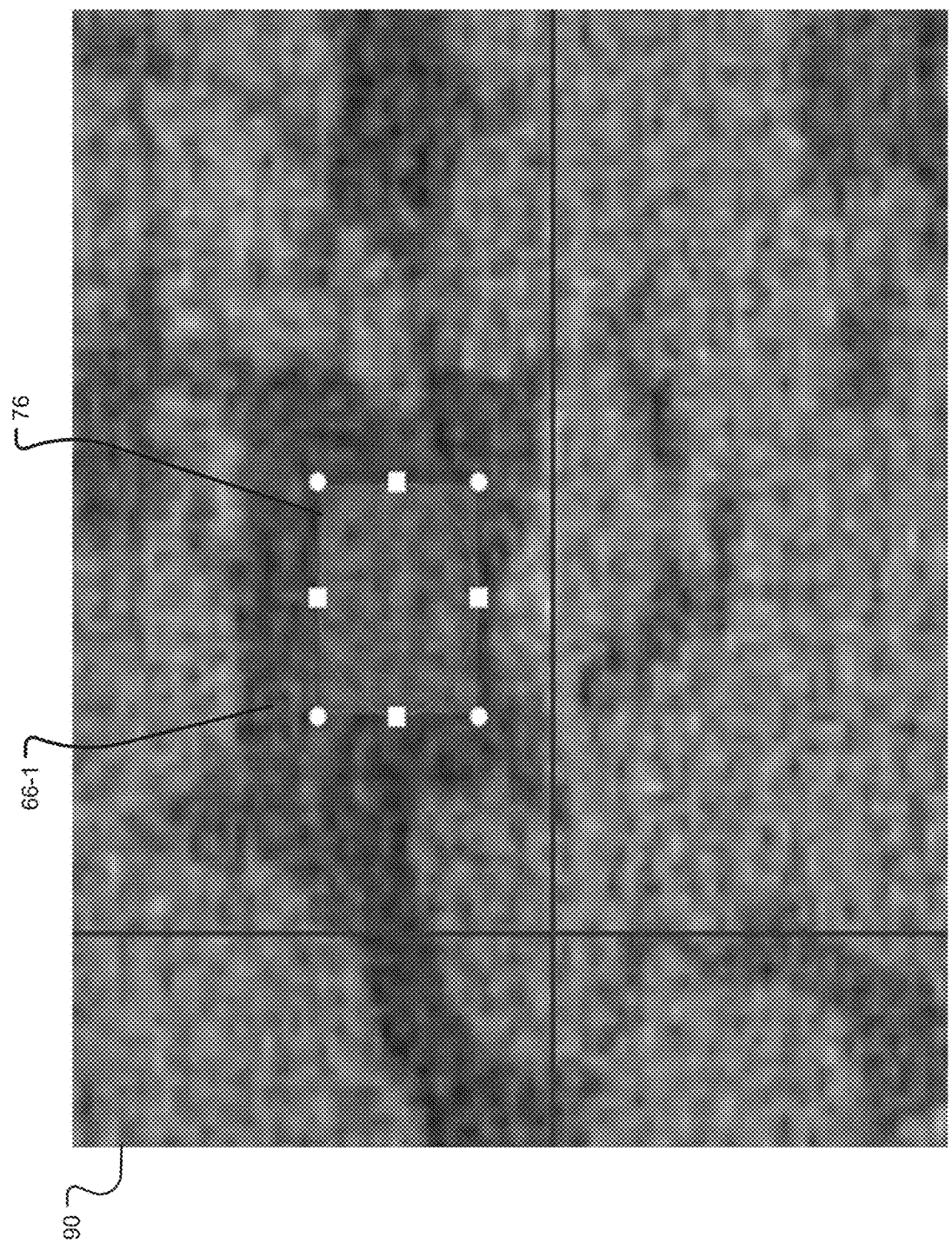
FIG. 15A is a magnified view of the slice selected in FIG. 13B, where an operator has used the Annotation and Analysis Tool to draw an oval within a dark pore phase of the selected slice to enable selection of that phase.
Figure 15B:
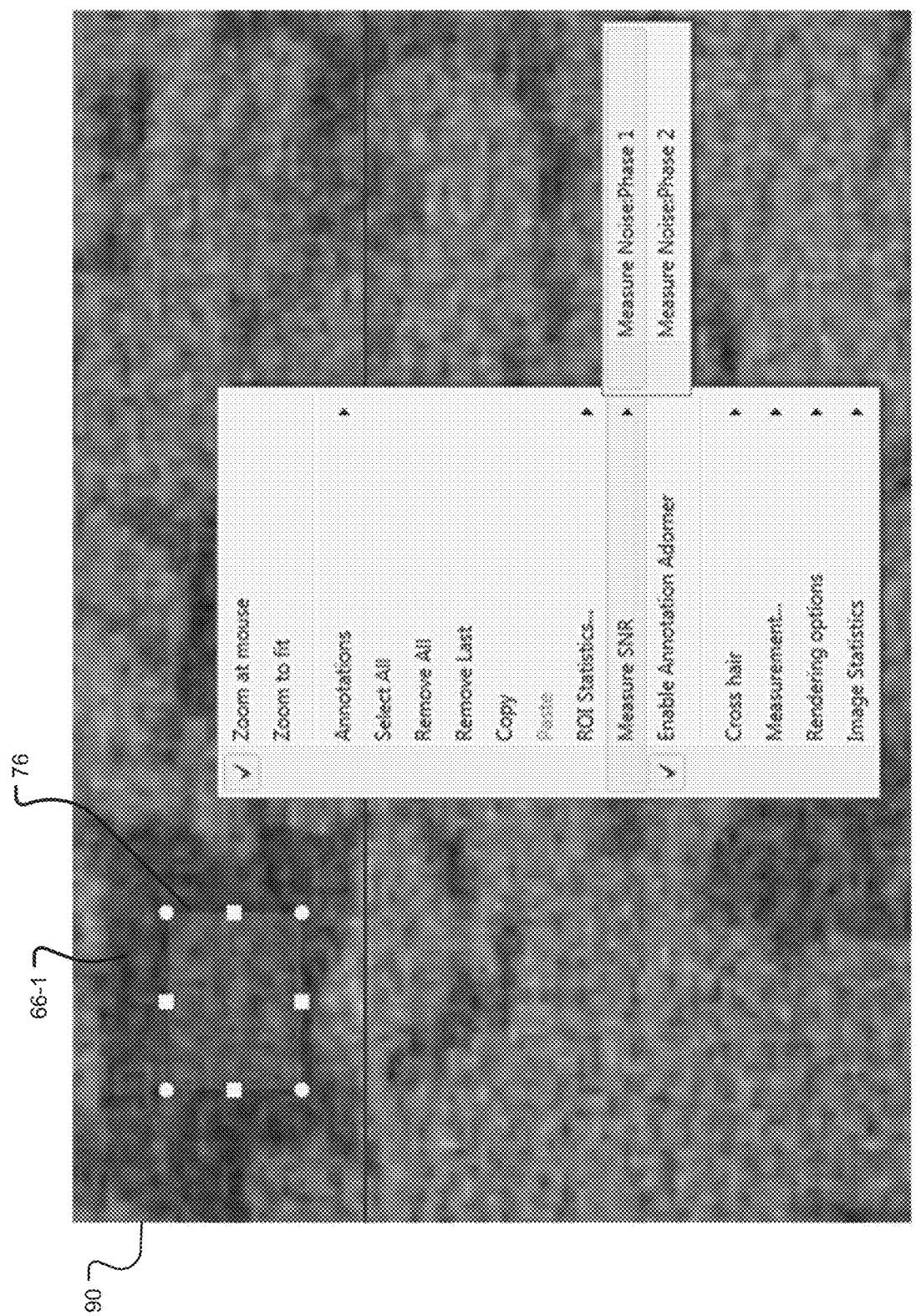
FIG. 15B shows the same magnified view of the slice as in FIG. 15A, where a "Measure SNR (Signal to Noise Ratio)" analysis operation is selected for execution upon the selected phase, the selection of which instructs the reconstruction application to calculate an image noise of the dark pore phase.
Figure 15C:
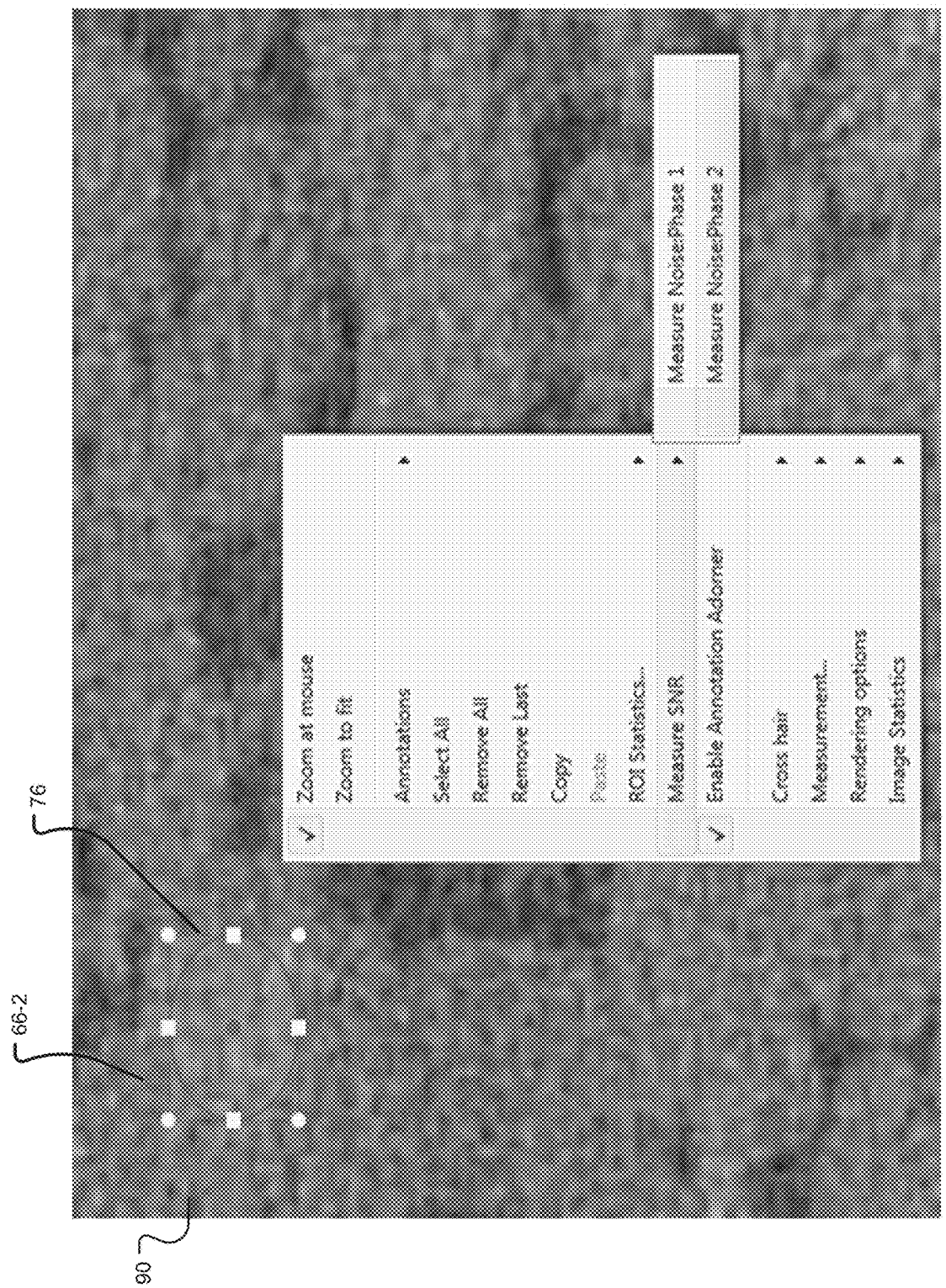
FIG. 15C shows the same magnified view of the slice as in FIGS. 15A, and 15B, where a different phase (here, a "grain" phase) is selected using the Annotation and Analysis Tool, and where the "Measure SNR" analysis operation is also selected to calculate an image noise of the grain phase.
Figure 16:
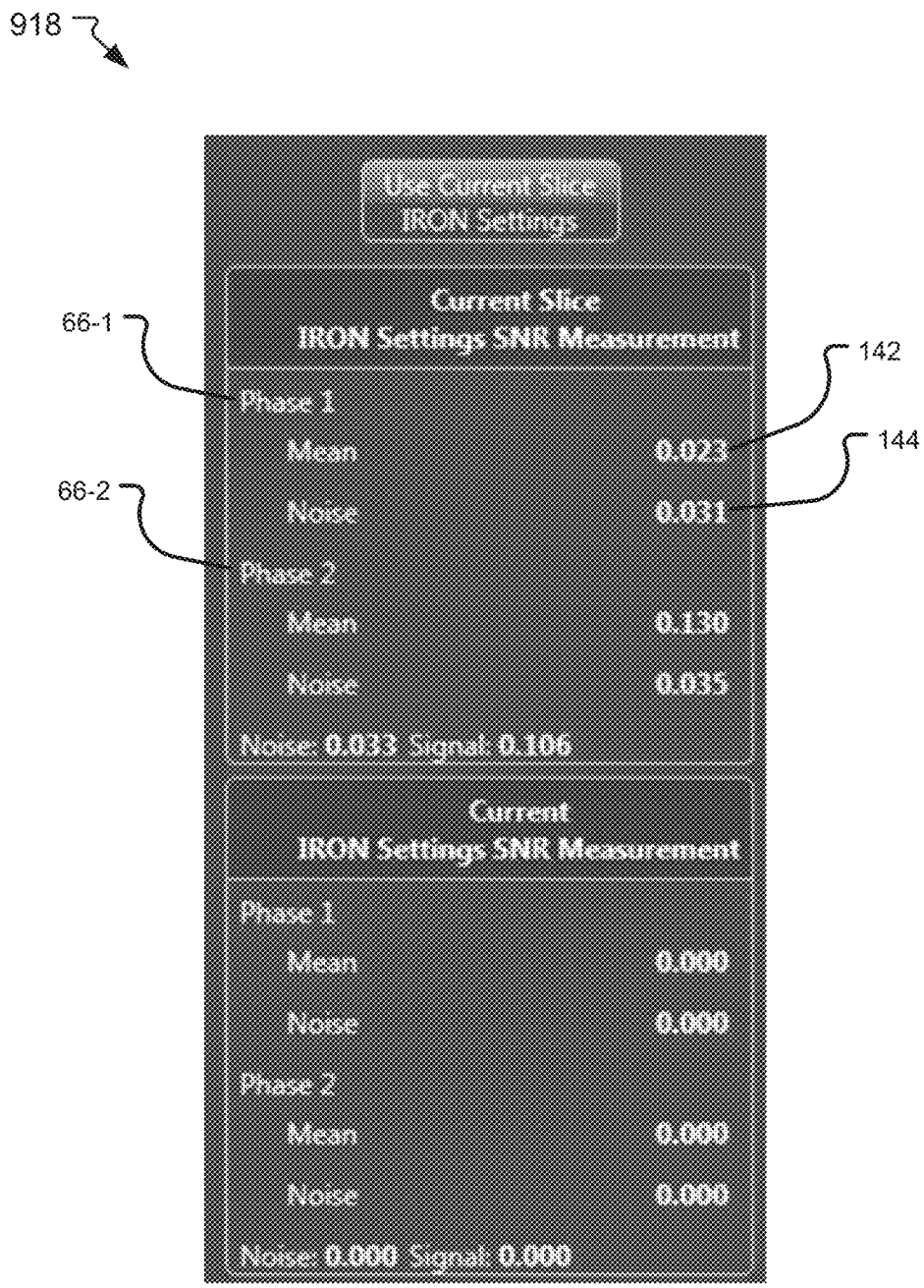
FIG. 16 is a magnified view of the GUI, showing details of a Noise Settings window that displays information associated with calculation of image noise of at least two selected phases of a sample, and where the Noise Settings window also displays the edge preserving cutoff parameter, gamma ($\delta$), that the reconstruction application determined from the calculated image noise of the phases in FIGS. 15B and 15C.
Figure 17:
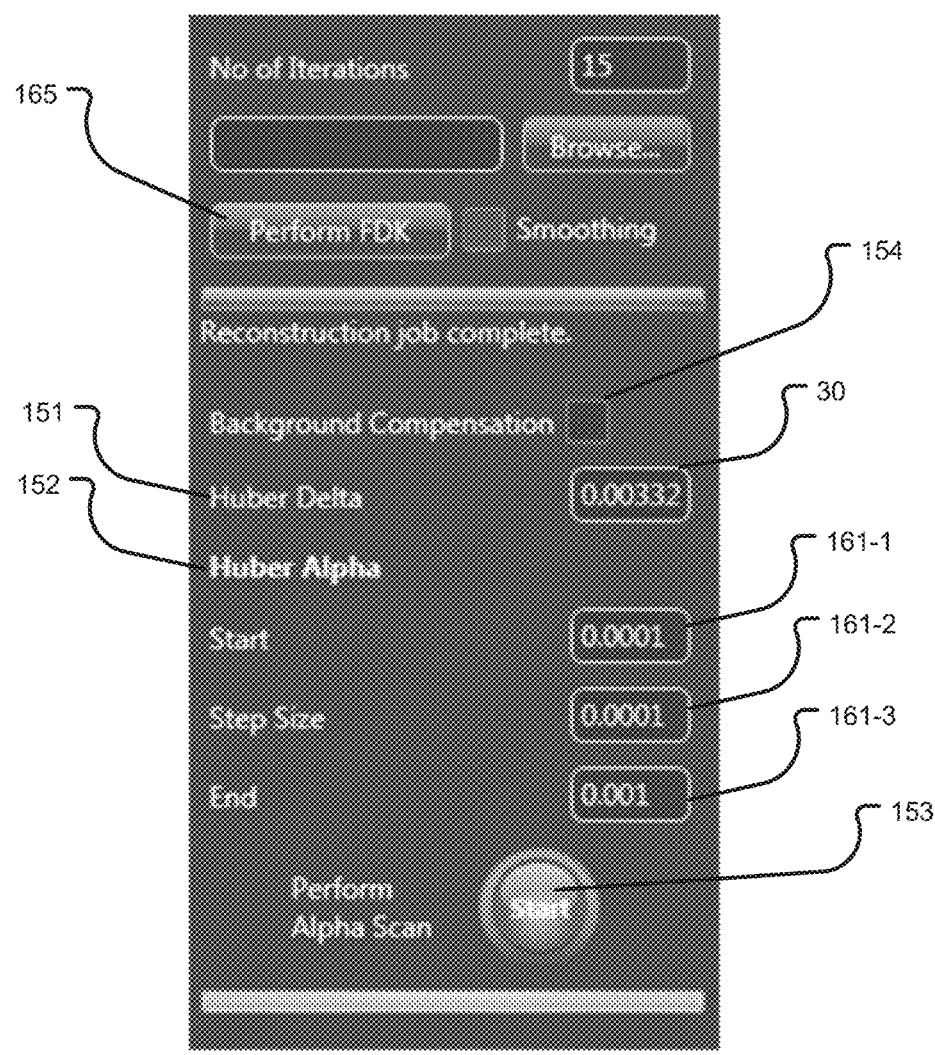
FIG. 17 is a magnified view of the GUI, showing details of the Intermediate Reconstruction window for determining the smoothing regularization parameter, alpha ($\alpha$)
Figure 18:
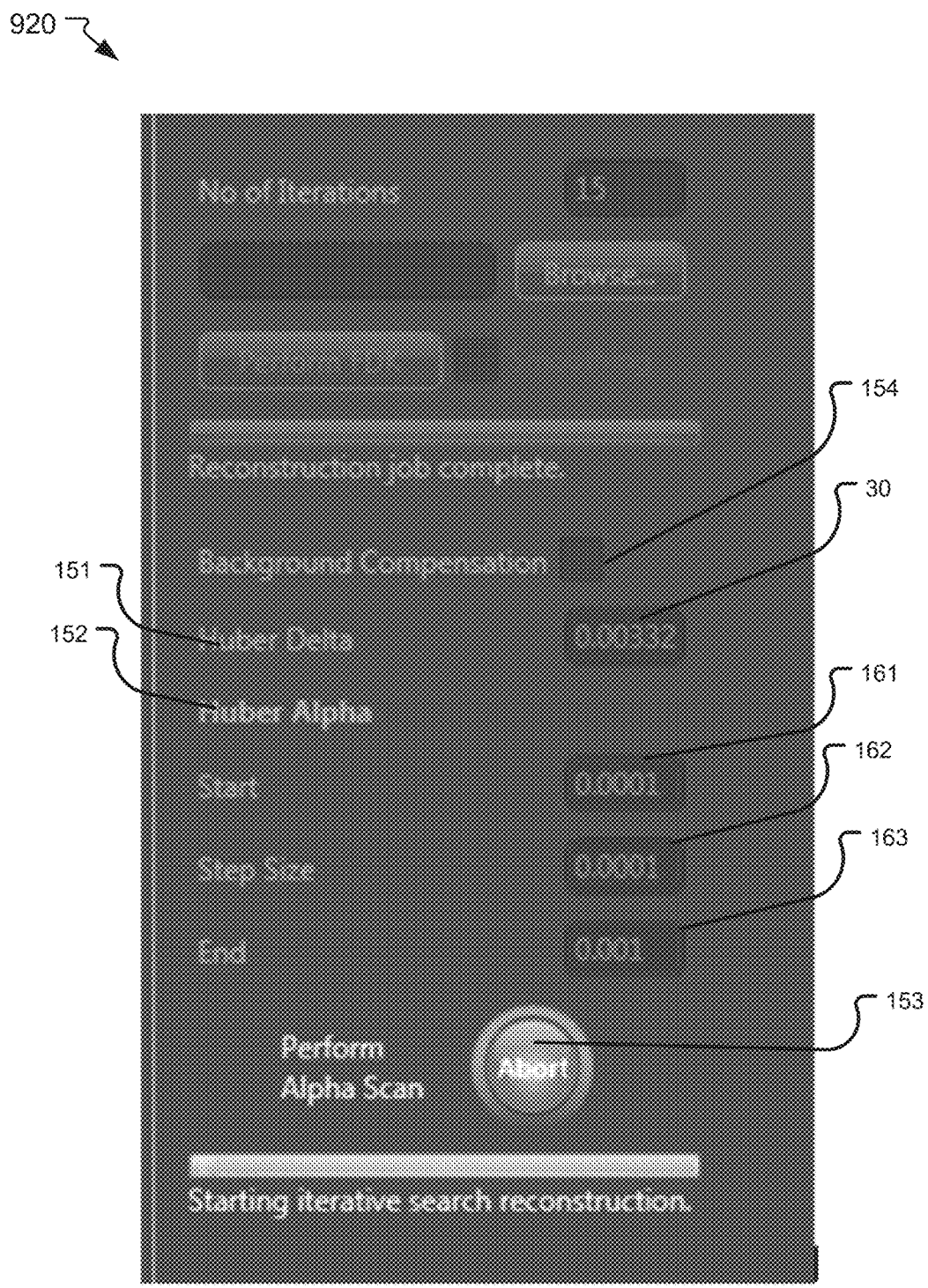
FIG. 18 also shows the Intermediate Reconstruction window as in FIG. 17, and also shows that an operator has used the Iterative Reconstruction Settings window to initiate execution of an iterative reconstruction of the sample, using the collected projections loaded in FIG. 8B, and also shows settings that include: default values for a set of scan parameters; the corrected center offset regularization parameter previously determined in FIG. 9B; the corrected beam hardening correction constant regularization parameter previously determined in FIG. 10B; and the determined edge preserving cutoff regularization parameter calculated in FIG. 16.

In more detail, in step 306, the application 126 identifies selection of two or more phases within a selected slice. In one implementation, step 306 is reached and executed after an operator has used the GUI 44 to select a first phase of a slice, as shown in FIG. 15A, and has selected a second phase of the slice, as shown in FIG. 15C. An Annotation and Analysis Tool 920 of FIG. 14 enables the phase selections in FIGS. 15A and 15C. The descriptions of FIGS. 14, 15A, and 15B are included herein below.

In step 308, the application 126 measures the standard deviations of pixel greyscales within each of the phases. Then, in step 310, the application 126 calculates the image noise of each of the phases. The image noise of each phase is the average (i.e. mean) of the standard deviations of the pixel greyscales within each phase.

According to step 312, the application 126 calculates mean values of the pixel greyscales within each of the phases. Then, in step 314, the application 126 calculates a "signal," which is the difference between the means of the phases. The application 126 divides the "signal" by the "noise" to obtain a signal to noise ratio (SNR) of the selected phases in step 316.

In step 318, the application 126 determines whether the SNR is less than a threshold value, such as 1.75. If the SNR is less than the threshold value, the method transitions to step 320. If the SNR is greater than or equal to the threshold value, the method transitions to step 322.

In step 320, because the SNR is too low in value, the application switches on a Gaussian filter in the FBP algorithm or process. The method then transitions to the beginning of step 304 to repeat the reconstruction.

In step 322, the application 126 selects a reconstructed central slice having the signal/noise value greater than the threshold value, and sets a value of the edge preserving cutoff (δ) 30 to be equal to (noise of the selected central slice)/10.

Step 330 describes one implementation for determining the smoothing parameter 20. In this implementation, the operator directs the computer system 124 to create at least portions of the sample 114 using iterative reconstruction and different smoothing parameters until a "smoothing" target signal to noise ratio is obtained. This signal to noise ratio is computed for each iteratively reconstructed portion, which is preferably a central region of the sample. The smoothing parameter 20 is varied with each iteratively reconstructed region until the iteratively reconstructed portion/region yielding the signal to noise ratio is obtained.

In more detail, according to step 330, using the value of the edge preserving cutoff parameter 30 and an initial smoothing parameter (α) 20 value equal to 0.1, the application 126 executes one or more convergent iterative reconstructions on a central region of the volume dataset until a value of the smoothing parameter 20 yields a reconstruction having a signal/noise of 22+/−1, varying the value of the smoothing parameter 20 with each additional iterative reconstruction, if required.

In step 372, the application 126 sets the value of the smoothing parameter 20 that yielded the reconstruction having a signal/noise of 22+/−1 as the optimized/final value for the smoothing parameter 20. The application 126 also saves the save the edge preserving cutoff parameter 30 and the smoothing parameter 20 to the data store 94.

Then, in step 374, the application 126 executes an iterative construction of the sample 114 using the collected projections 26 and the determined regulation parameters (the corrected center offset 24, the corrected beam hardening correction constant 22, the optimized edge preserving cutoff parameter 30, and the smoothing parameter 20) to generate an iteratively constructed volume dataset of the sample 114.

However, in other embodiments, the edge preserving cutoff regularization parameter and the smoothing regularization parameter are (or either one of the edge preserving cutoff regularization parameter or the smoothing regularization parameter is) accessed from a database that stores previously-used ones of these parameters. Sometimes the previously determined parameters for the same or similar sample can be reused for new reconstructions.

Figure 4:
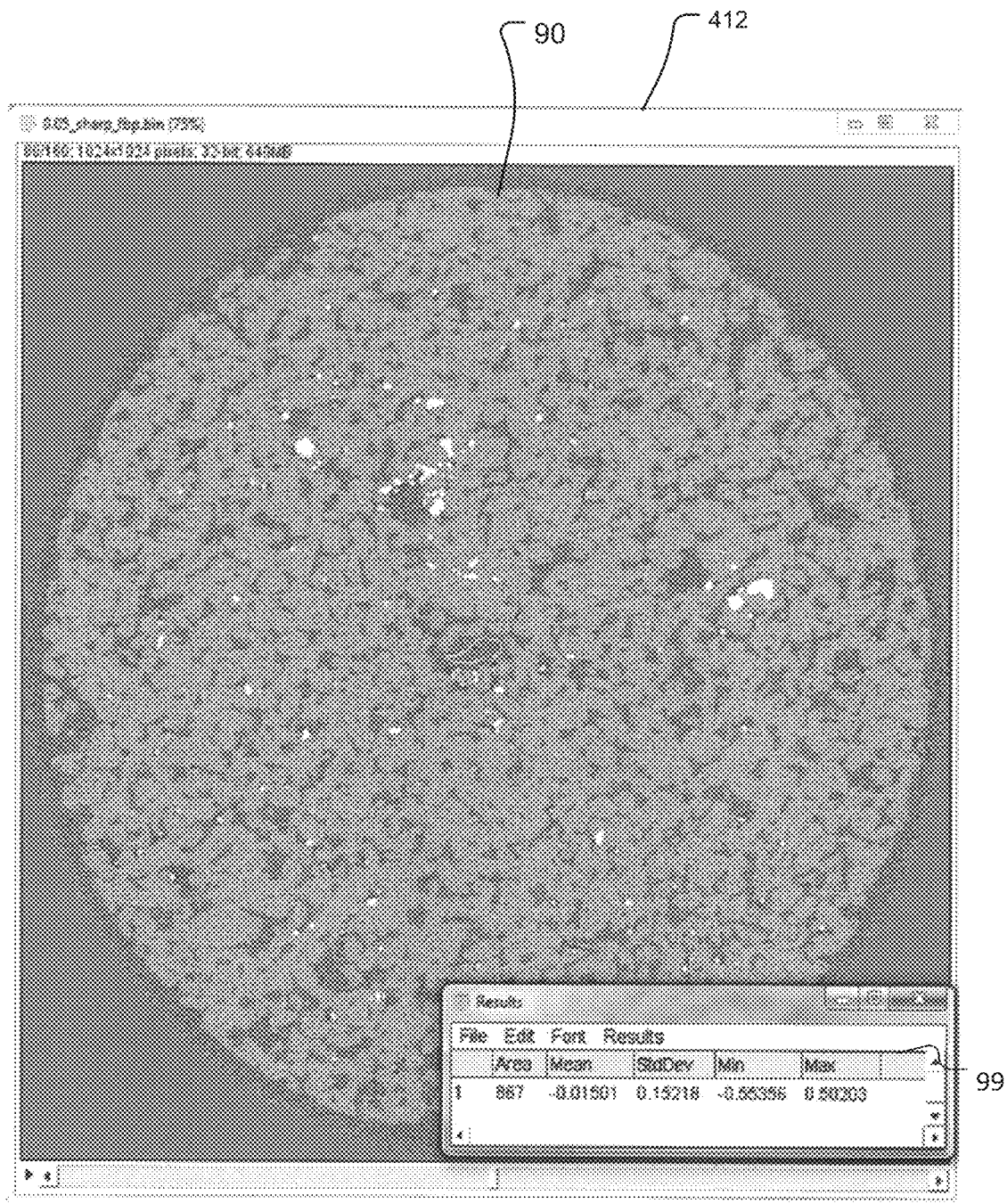
FIG. 4 and FIG. 5 are reconstructed central slices of an exemplary sample displayed within a graphical user interface (GUI) of the reconstruction application as might be displayed on the display device of the computer system, where the slices are created in the method of FIG. 3, and where an operator selects phases within the slice to enable the reconstruction application to determine the edge preserving cutoff regularization parameter.
Figure 5:
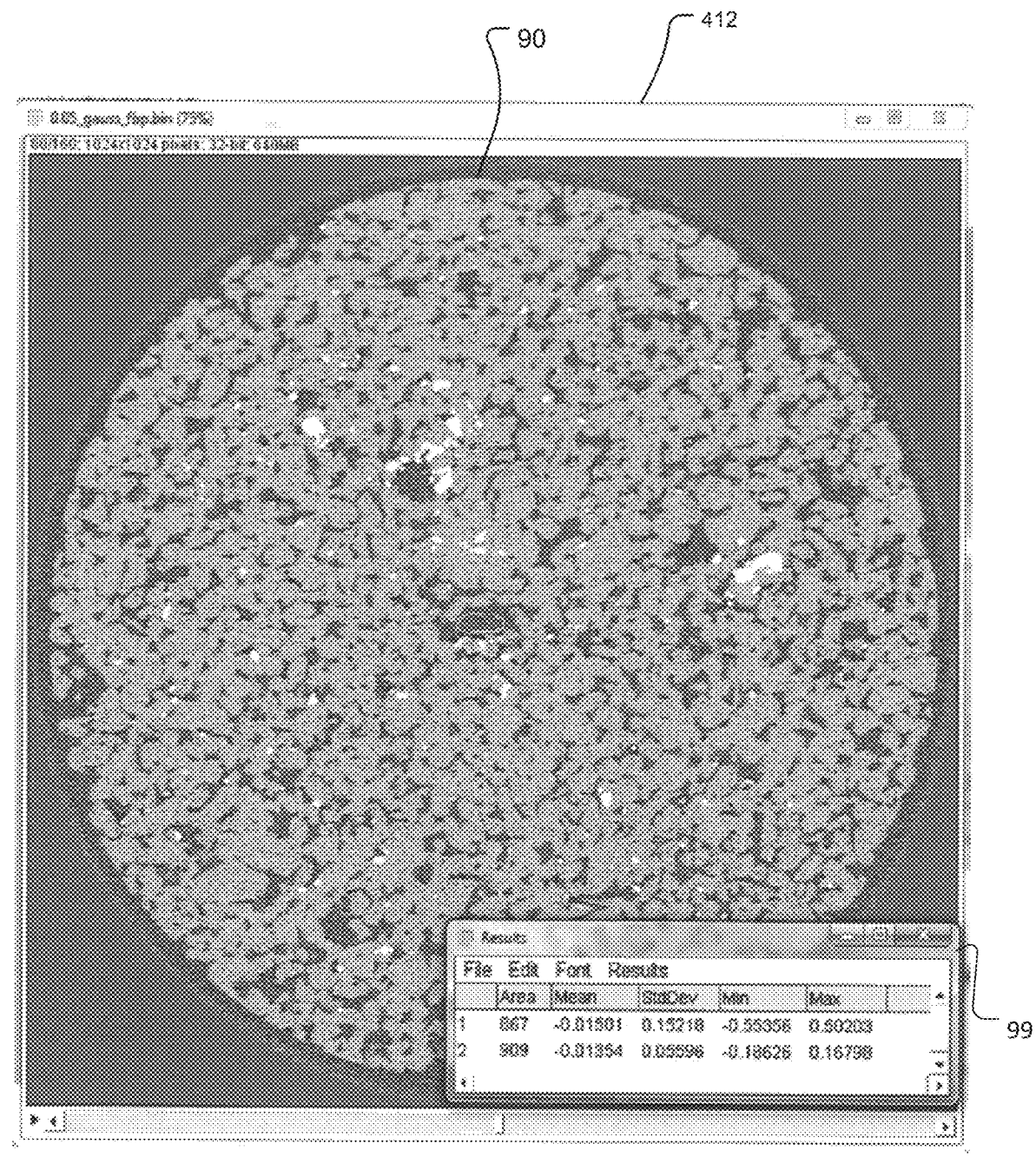

FIG. 4 and FIG. 5 show a reconstructed central slice 90 of a sample, created in accordance with the method of FIG. 3. An operator selects the slice 90 for determination of the edge preserving cutoff regularization parameter.

In FIG. 4, the operator has selected a first phase of a sample 114 from a representative central slice 90. Using a statistical reporting tool 99 upon the central slice 90, the operator obtains statistical information for an area within the image corresponding to a first phase of the sample 114. Here, the selected phase might be "air."

In FIG. 5, the operator has selected a second phase of the sample 114 from an image-enhanced version of the same central slice 90. The computer system 124 created the imaged-enhanced slice by turning on a Gaussian filter in the FBP. Using the statistical slider tool 99, the operator additionally obtains statistical information for an area within the image corresponding to a second phase of the sample. Here, the selected phase is a compound within the sample 114. The computer system 124 then calculates the edge preserving cutoff parameter 20 based upon the difference between the image noise of the phases in FIG. 5 and FIG. 4.

Figure 6:
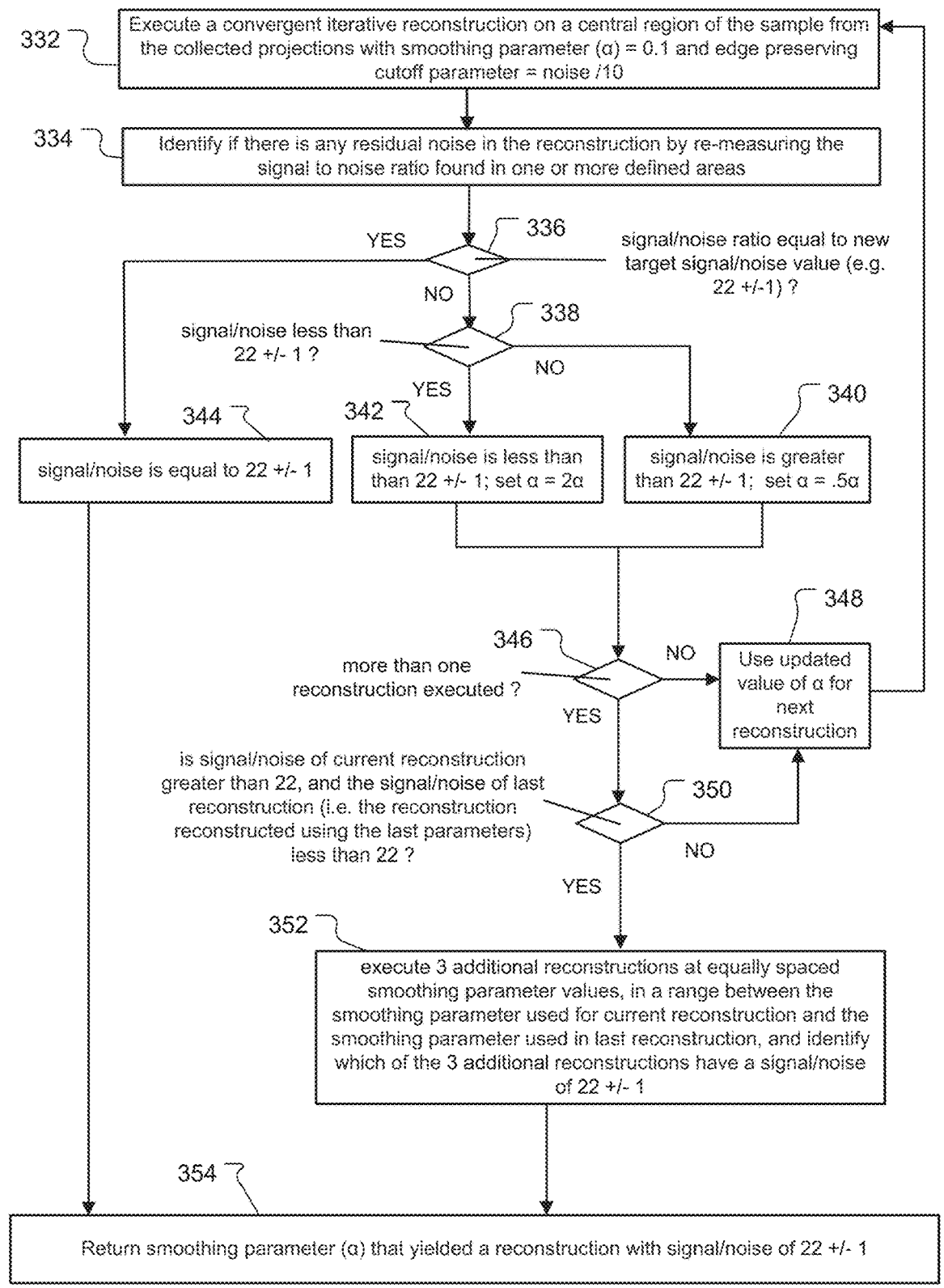
FIG. 6 is a flow diagram detailing how the reconstruction application iteratively reconstructs portions of the sample, using the determined edge preserving cutoff regularization parameter, to then determine the smoothing regularization parameter.

FIG. 6 is a flow chart that provides more detail for the method of FIG. 3 and specifically step 330.

The flow chart of FIG. 6 details how the reconstruction application 126 iteratively reconstructs portions of the sample 114 to determine the smoothing parameter 20.

In step 332, the computer system 124 executes a convergent iterative reconstruction on a central region of the sample from the collected projections with smoothing parameter (α)=0.1 and edge preserving cutoff parameter=noise/10.

In step 334, the computer system 124 identifies if there is any residual noise in the reconstruction by re-measuring the signal to noise ratio found in one or more defined areas.

Then in step 336, it is determined whether the signal/noise ratio is equal to new target signal/noise value (e.g. 22+/−1).

If the signal/noise ratio is equal to new target signal/noise value, then the process returns smoothing parameter (α) that yielded a reconstruction with signal/noise of 22+/−1 in steps 344 and 354.

If the signal/noise ratio is not equal to new target signal/noise value, then it is determined whether the signal/noise less than 22+/−1, and the smoothing parameter (α) is set to 2 a or 0.5 a in steps 342 or 340.

In step 350 it is determined if signal/noise of current reconstruction greater than and the signal/noise of last reconstruction (i.e. the reconstruction reconstructed using the last parameters) is less than 22. An updated value is used for the smoothing parameter (α) in the next reconstruction in step 348. Or, three additional reconstructions are executed at equally spaced smoothing parameter values, in a range between the smoothing parameter used for current reconstruction and the smoothing parameter used in last reconstruction. The computer system the identifies which of the 3 additional reconstructions have a signal/noise of 22+/−1.

Figure 7:
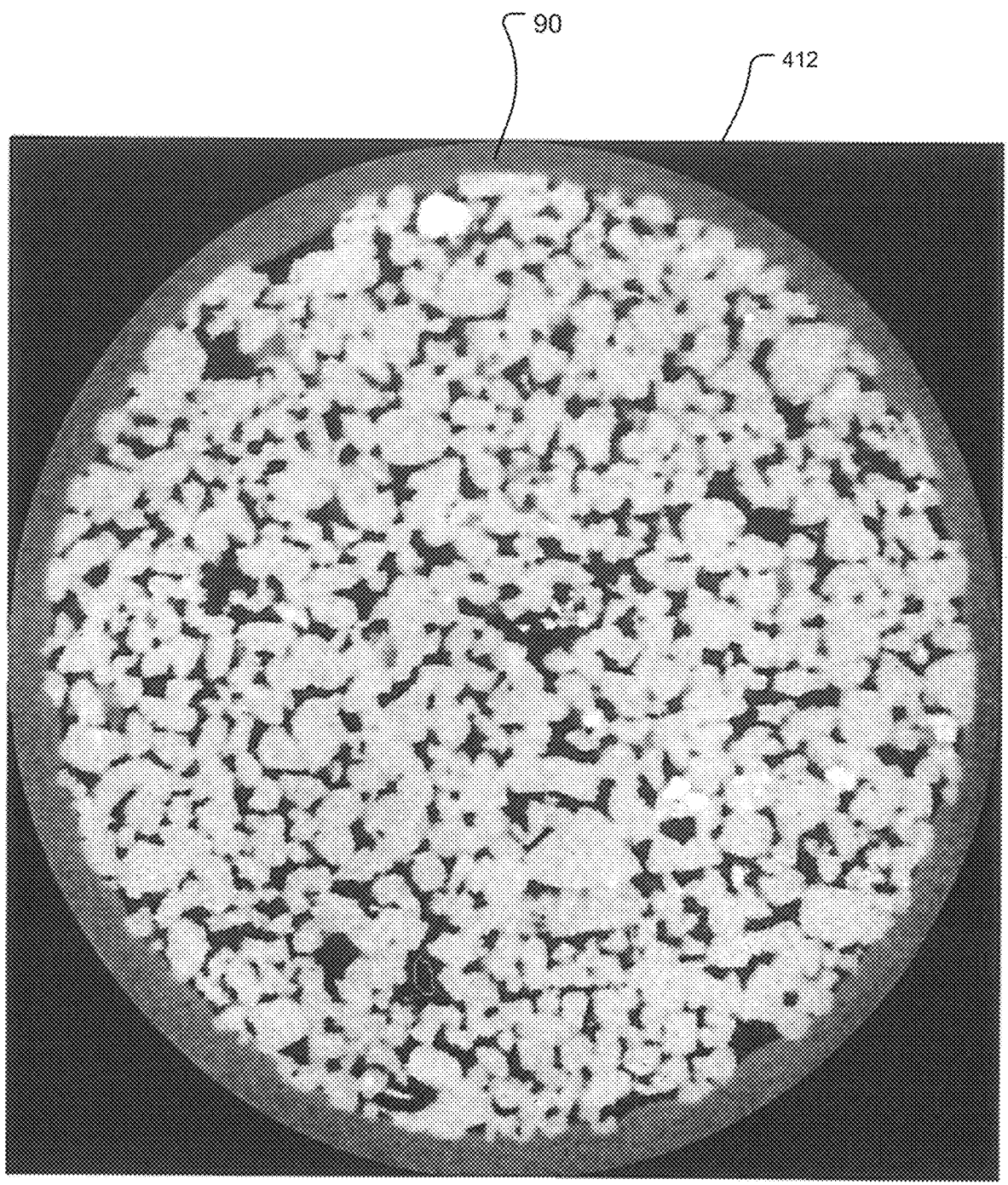
FIG. 7 is a central slice selected from an iterative reconstruction of the sample performed by the method of FIG. 6, where the reconstruction was created for determining the smoothing regularization parameter.

FIG. 7 is a central slice selected of the same exemplary sample, created in accordance with the method of FIG. 6.

The slice 90 is associated with an iterative reconstruction that yielded an optimal smoothing parameter 20. This smoothing parameter 20, in conjunction with the edge preserving cutoff parameter 30, the beam hardening correction constant 22, the center offset 24, and the projection data 26, will be used by the reconstruction application 126 to create an interactively reconstructed volume dataset of the sample 114.

The remaining figures provide detail for the GUI 44 of the reconstruction application 126. Various fields and display windows are shown within the GUI, where the types of windows/fields can be dependent upon the operation currently selected by an operator. Additionally, the figures also illustrate a workflow for determining the regularization parameters necessary for creating noise-optimized and optimally smoothed reconstructions of the sample 114.

FIG. 8 through FIG. 11 illustrate a workflow for determining a corrected center offset regularization parameter 24 and a corrected beam hardening constant 24.

In more detail, FIG. 8A shows a main screen of the GUI 44 before an operator has selected projection data 26 of a sample 114 for loading into the reconstruction application 126. A file browser widget 802 of the GUI 44 is shown.

FIG. 8B shows more detail for the file browser widget 802 of the GUI 44. The file browser widget 802 enables selection of a set of projection data 26 for loading into the reconstruction application 126.

Figure 9A:
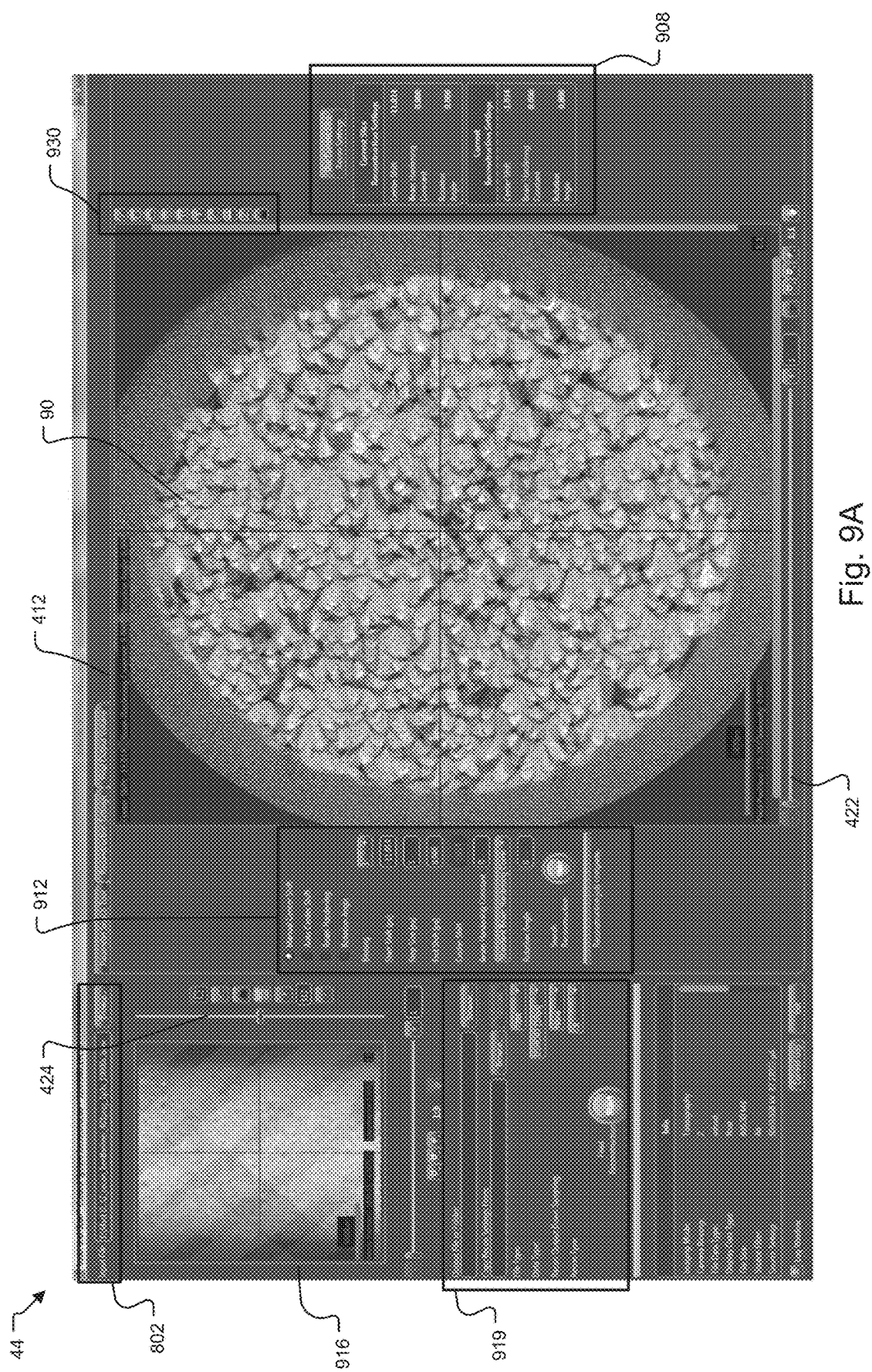
FIG. 9A shows the GUI after the reconstruction application has loaded the projection data collected in FIG. 8B, where contrast information of a slice selected by the operator from the projection data is also shown, and where the slice is selected to determine a corrected version of the center offset regularization parameter of the slice, though the selected slice is improper for this purpose.
Figure 9B:
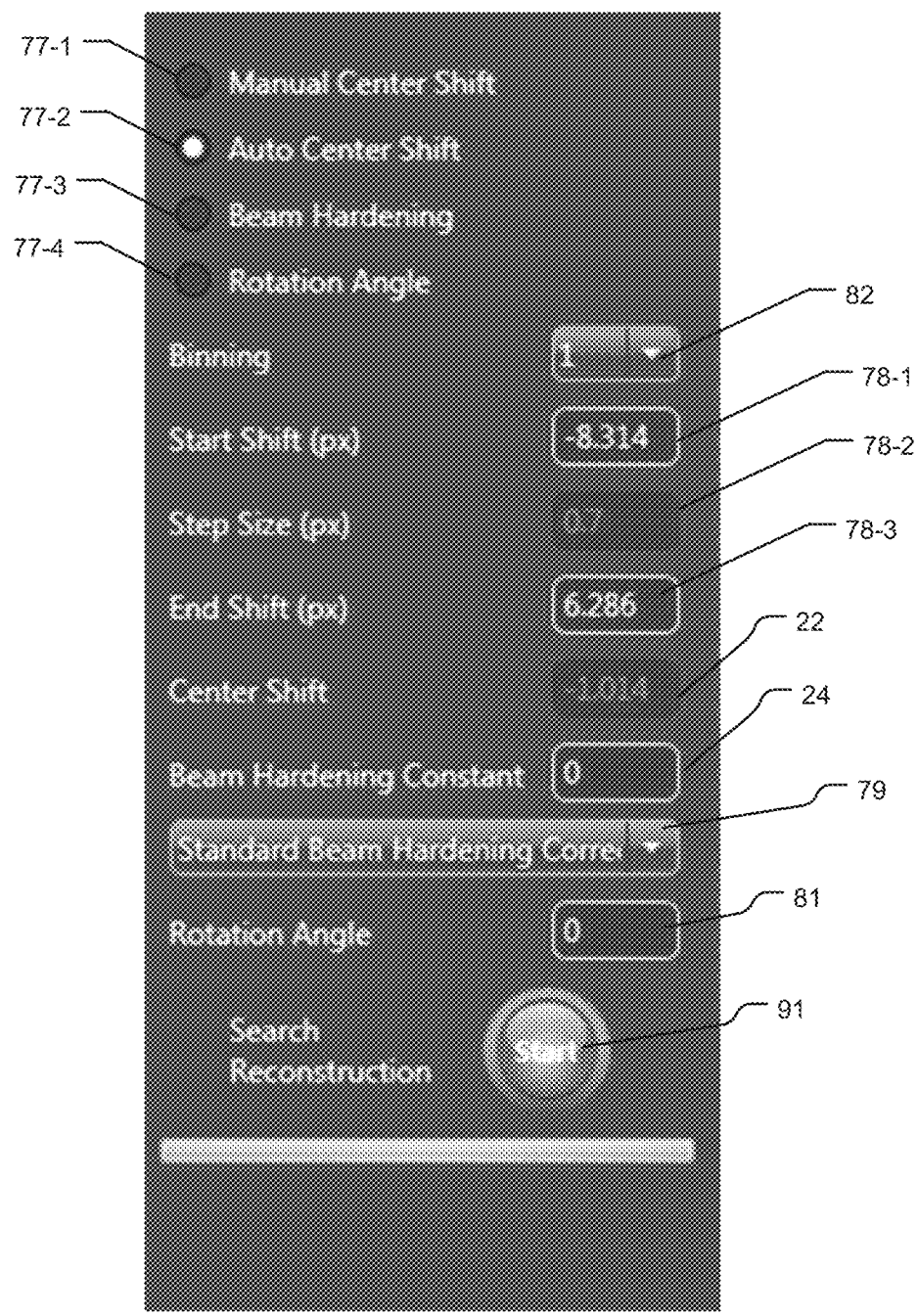
FIG. 9B is a magnified view of the GUI, showing details of a Modify Slice Settings window that enables operator-defined modification of the reconstruction settings of a selected and displayed slice.

FIGS. 9A and 9B illustrate how an operator uses the GUI 44 to determine a corrected center offset 24.

Once the reconstruction application 126 has loaded the projection data 26 in response to operator selection in FIG. 8B, various GUI elements and windows within the GUI 44 are enabled and shown in FIG. 9A. Specifically, the various GUI elements and windows are populated with information associated with the projection data 26, and/or are enabled to execute operations upon the projection data 26.

In more detail, windows and/or GUI elements displayed within the GUI 44 include a Reconstruction Manager window 919, a Slice Settings Window 908, an Intermediate Reconstruction window 920, a Modify Slice Settings window 912, a slice magnification window 916, an Annotation and Analysis Tool 930, a slider bar 422, a magnification slider bar 424, and a slice display window 412.

In FIG. 9A, a slice 90 is selected from the projection data 26 and displayed in the display window 412.

The slider bar 422 performs different operations depending upon the mode or context. In FIG. 9A, the slider bar 422 allows an operator to select different scan parameters.

Via the Modify Slice Settings window 912, the operator performs a manual calculation of the center offset 24.

FIG. 9B shows the Modify Slice Settings window 912. Button 77-1 selects the manual center shift operation; button 77-2 selects the auto center shift operation; button 77-3 selects the beam hardening operation; and button 77-4 selects the rotation angle. The auto center shift operation button 77-3 is current selected.

The operator selects the manual center shift operation to manually calculate the center offset 24. The operator selects this option to create a corrected version of the center offset 24. For this purpose, the operator enters a start offset via a start shift field 78-1, an end offset via an end shift field 78-3, and a step size via a step size field 78-2. These fields 78 require entry in pixels (px).

The window 912 also has a binning selector 82, a beam hardening constant entry field 24, an operation selector 79, a rotation angle entry field 81, and a "Search Reconstruction" button 91.

Returning to FIG. 9A, the operator determines that the selected slice 90 reveals no phase information. As a result, the operator must select a different slice.

Figure 9C:
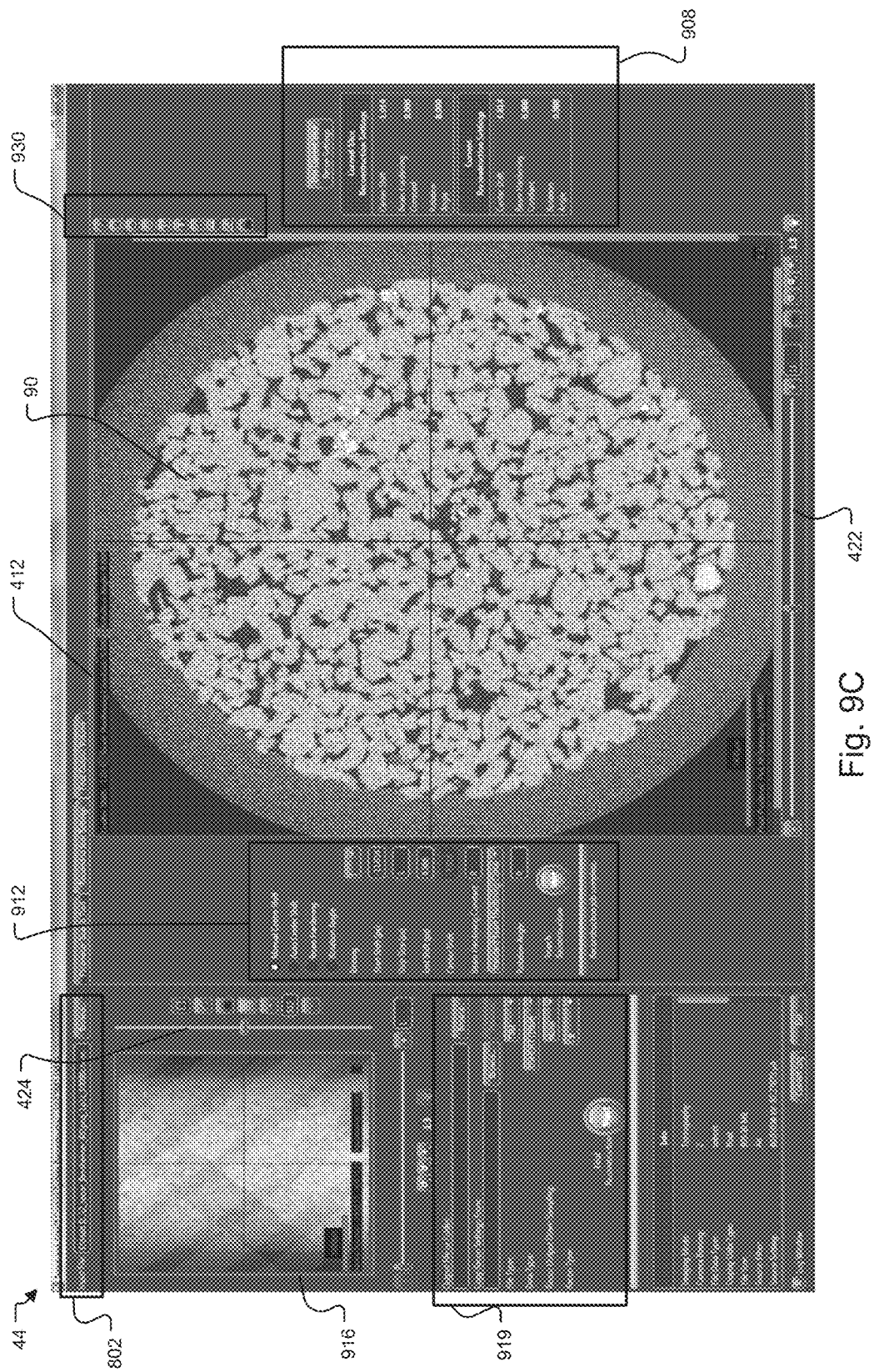
FIG. 9C shows the GUI as in FIG. 9A, for a different slice selected and displayed within the GUI, and where the different slice is a proper slice for determining the corrected version of the center offset regularization parameter.

FIG. 9C displays a contrast enhanced slice.

Figure 9D:
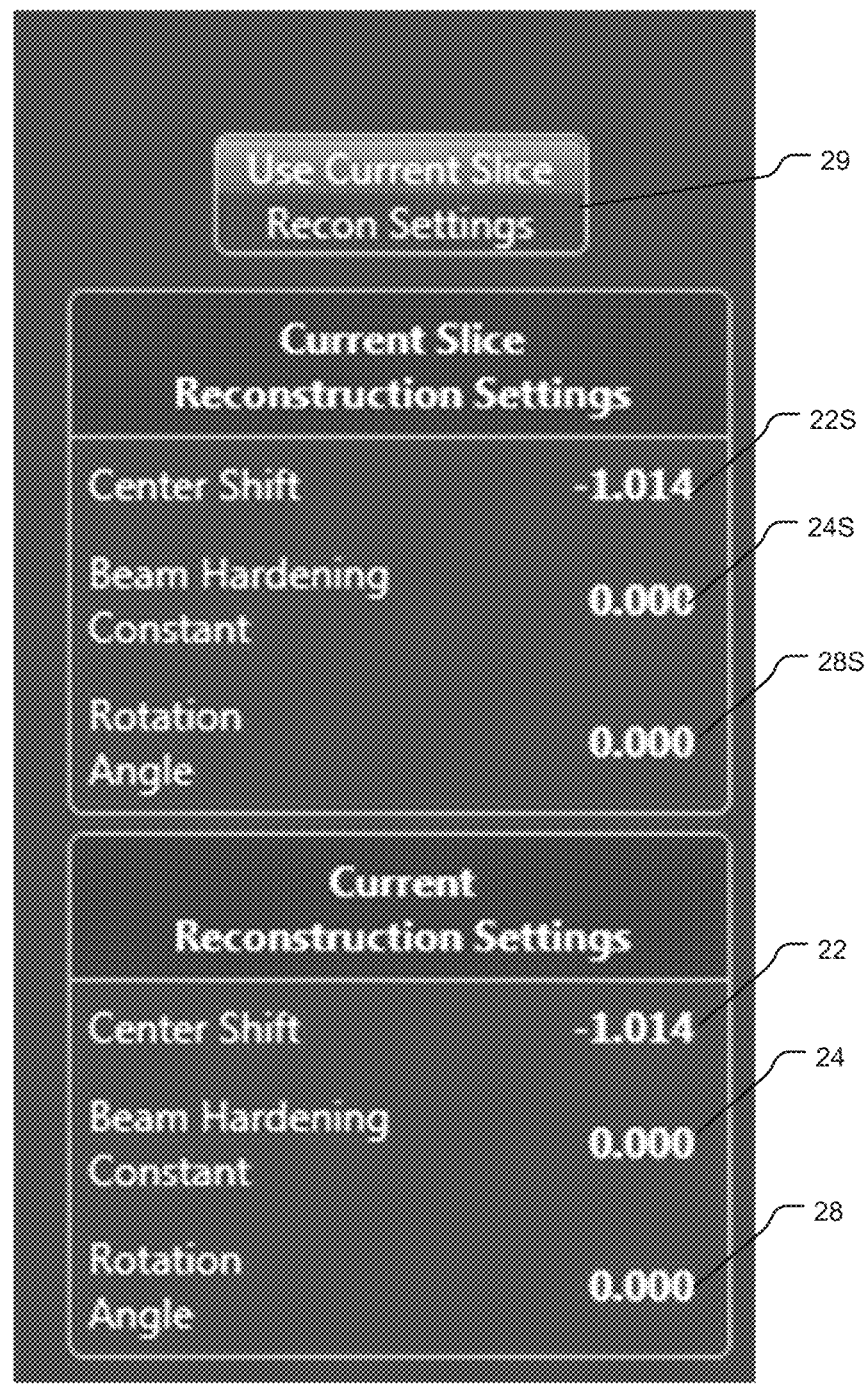
FIG. 9D is a magnified view of the GUI, showing details of a Slice Settings window that displays current slice reconstruction settings for a selected slice displayed within the GUI, where the slice reconstruction settings include standard regularization parameters of the slice such as its center offset, beam hardening correction constant, and rotation angle.

FIG. 9D displays a Slice Settings window 908. The window 908 displays the currently selected center offset 24S/shift of the slice 90, the beam hardening correction constant 24S of the slice 90, and the rotation angle 28S of the slice 90. To apply these slice-specific settings for use in subsequent reconstructions using the projection data 26, the operator selects the "Use Current Slice Recon Settings" button 29. This applies the slice-specific settings for current offset 24S, beam hardening correction constant 22S, and rotation angle 28S to the system-wide center offset 24, beam hardening correction constant 22, and rotation angle 28. The center offset 24 and beam hardening correction constant 22 are then stored to the data store 94.

Figure 10:
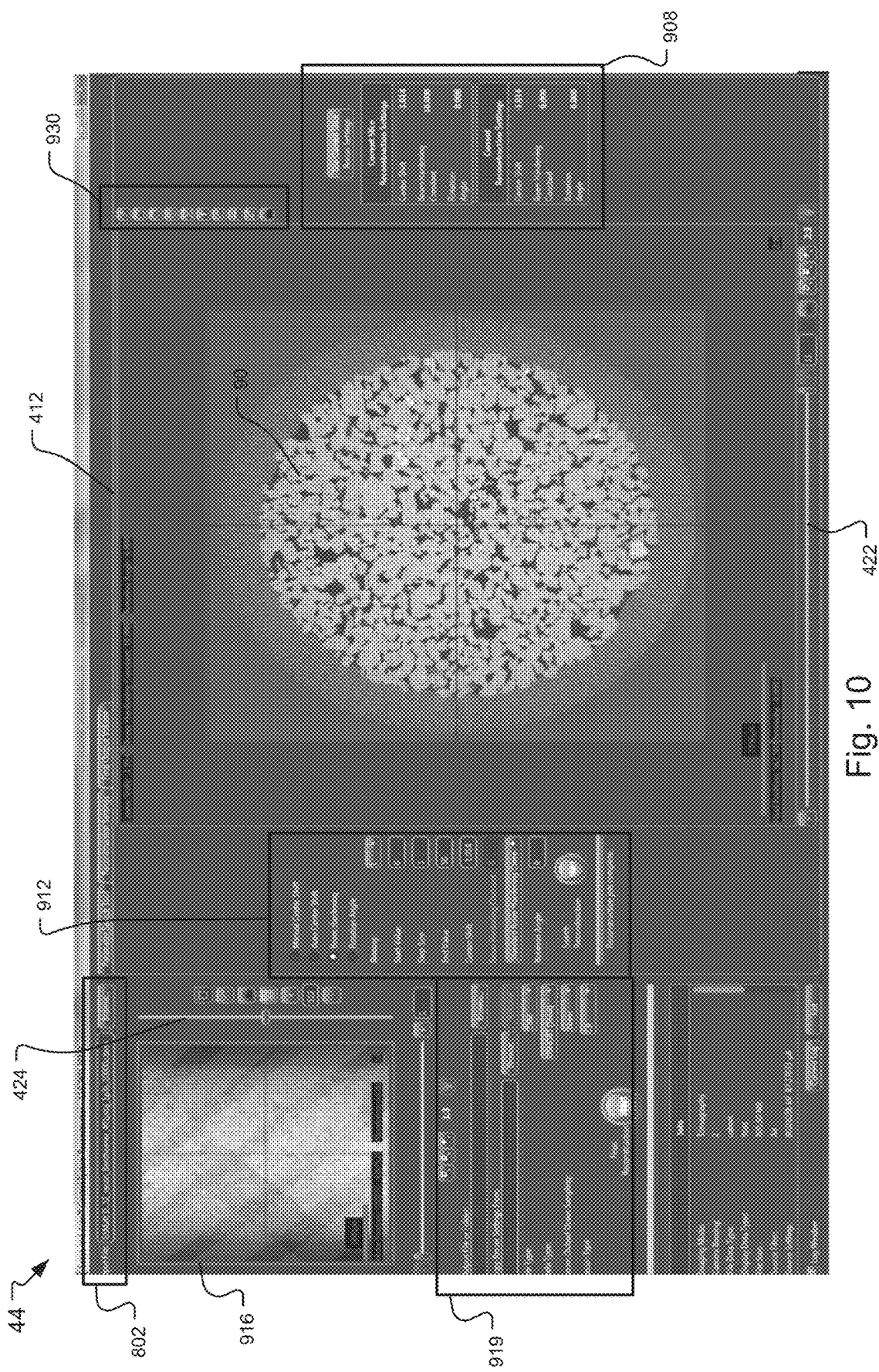
FIG. 10 shows the GUI, where contrast information for another selected slice is shown, and where the slice is selected to determine a corrected version of the beam hardening correction constant regularization parameter, though the selected slice is improper for this purpose.
Figure 11:
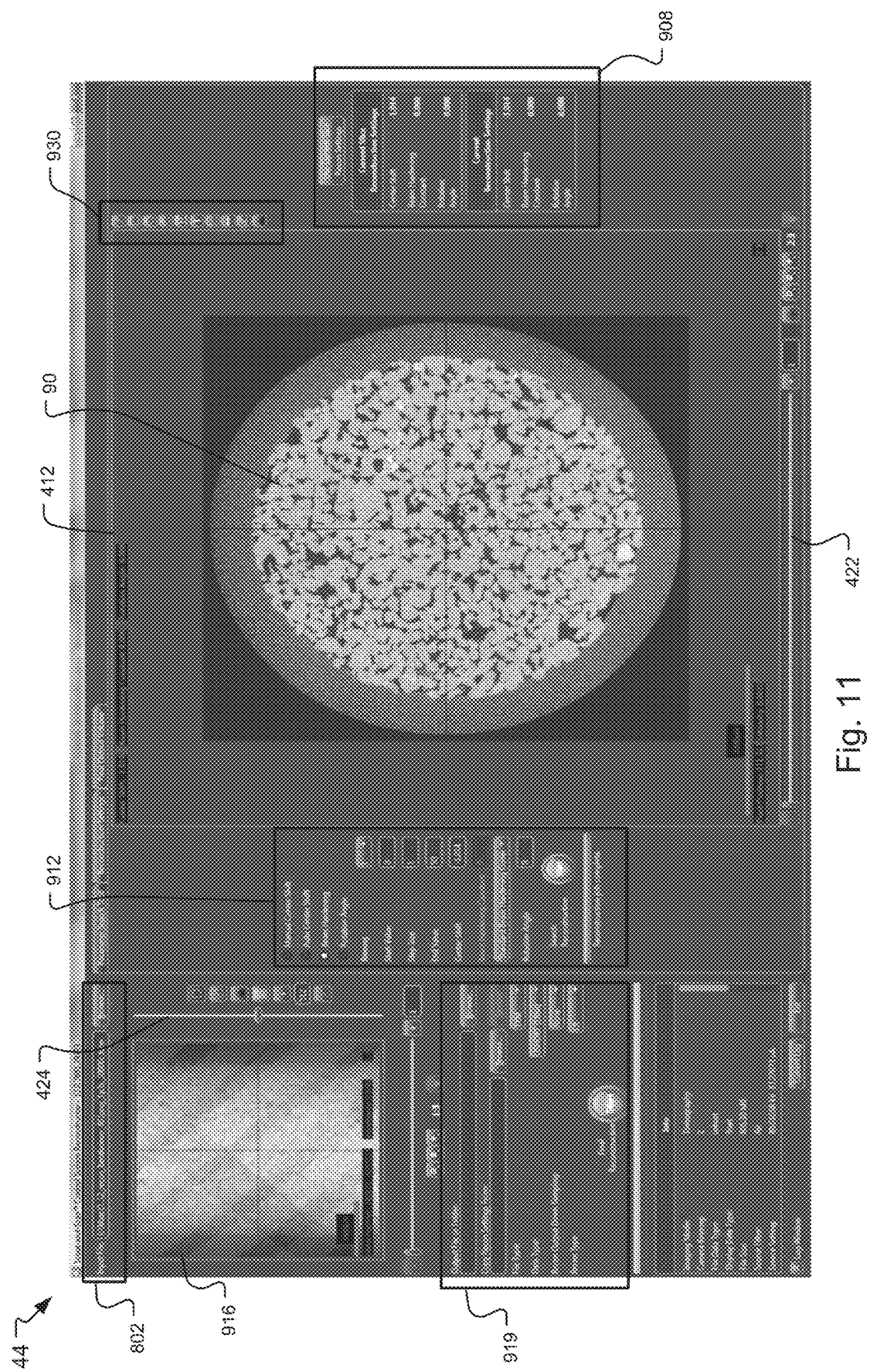
FIG. 11 illustrates the GUI as in FIG. 10, for a different selected slice, where the different slice is a proper slice for determining the corrected version of the beam hardening correction constant regularization parameter.

FIGS. 10 and 11 illustrate how an operator uses the GUI 44 to determine a corrected beam hardening correction constant 22.

In FIG. 10, the operator selects the beam hardening operation button 77-3 within the Modify Slice Settings window 912. The operator selects this option to create a corrected version of the beam hardening correction constant 22. However, the selected slice 90 in FIG. 10 is improper for this operation. As a result, the operator selects a different slice, shown in FIG. 11.

In FIG. 11, the operator then selects the "Use Current Slice Recon Settings" button 29 within the Modify Slice Settings window 912. This applies the slice-specific settings for current offset 24S, beam hardening correction constant 22S, and rotation angle 28S to the system-wide center offset 24, beam hardening correction constant 22, and rotation angle 28.

FIG. 12A through FIG. 17 illustrate a workflow for determining an edge preservation cutoff regularization parameter 30.

FIG. 18 through FIG. 22C illustrate a workflow for determining an smoothing regularization parameter 20. Using the smoothing parameter 20 and the projection data 26, in conjunction with the previously determined edge preservation cutoff regularization parameter 30, center offset 24, and beam hardening correction constant 22, the reconstruction application 126 creates an iteratively reconstructed volume dataset of the sample 114.

Figure 19A:
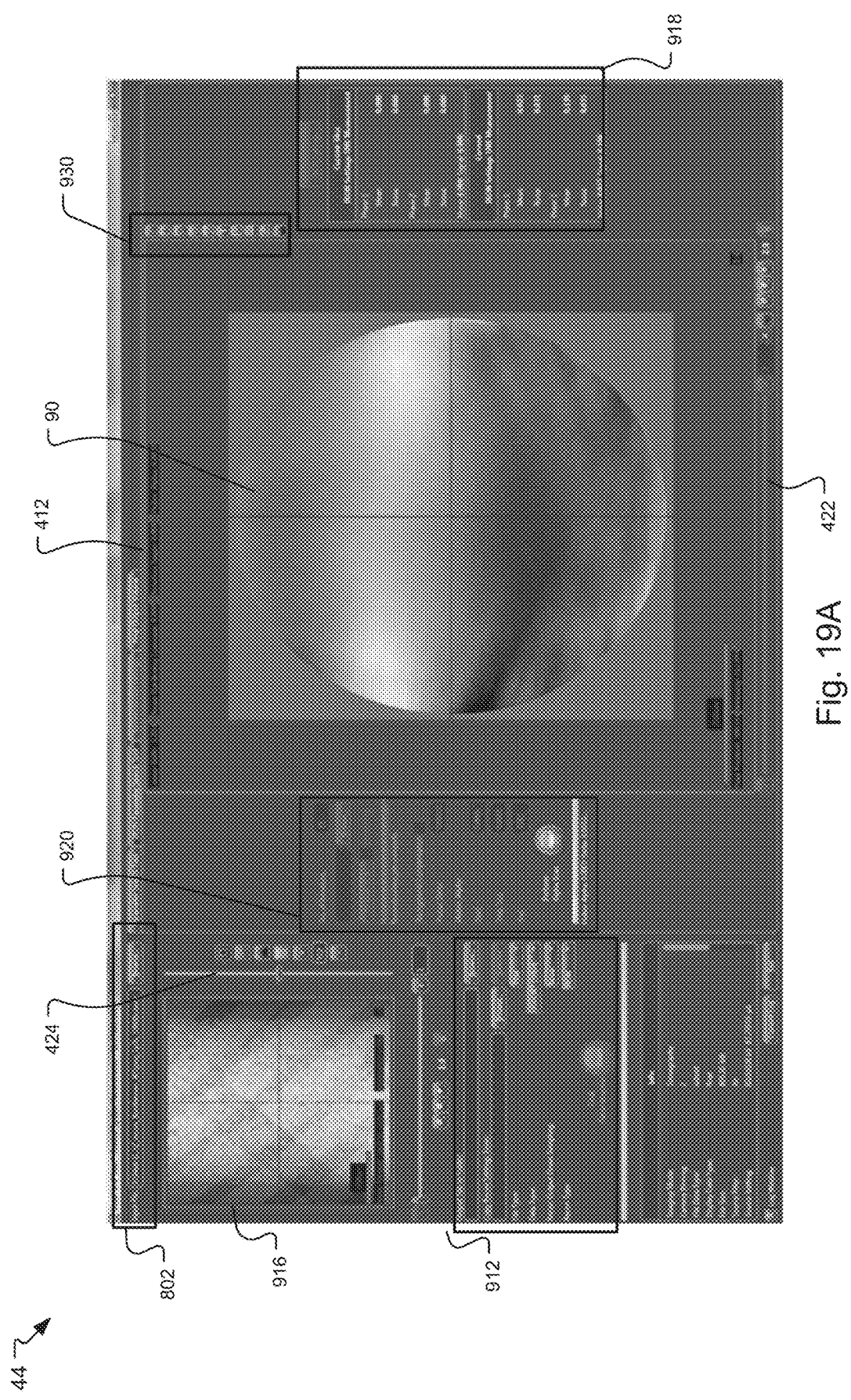
FIG. 19A shows the GUI after the initial iterative reconstruction of the sample was executed via the intermediate Reconstruction window in FIG. 18, where a slice selected by the operator from the reconstruction is also displayed, and where the contrast of the displayed slice likely indicates that the settings selected for the reconstruction has yielded an improper "undersmoothed" value of the smoothing regularization parameter.
Figure 20:
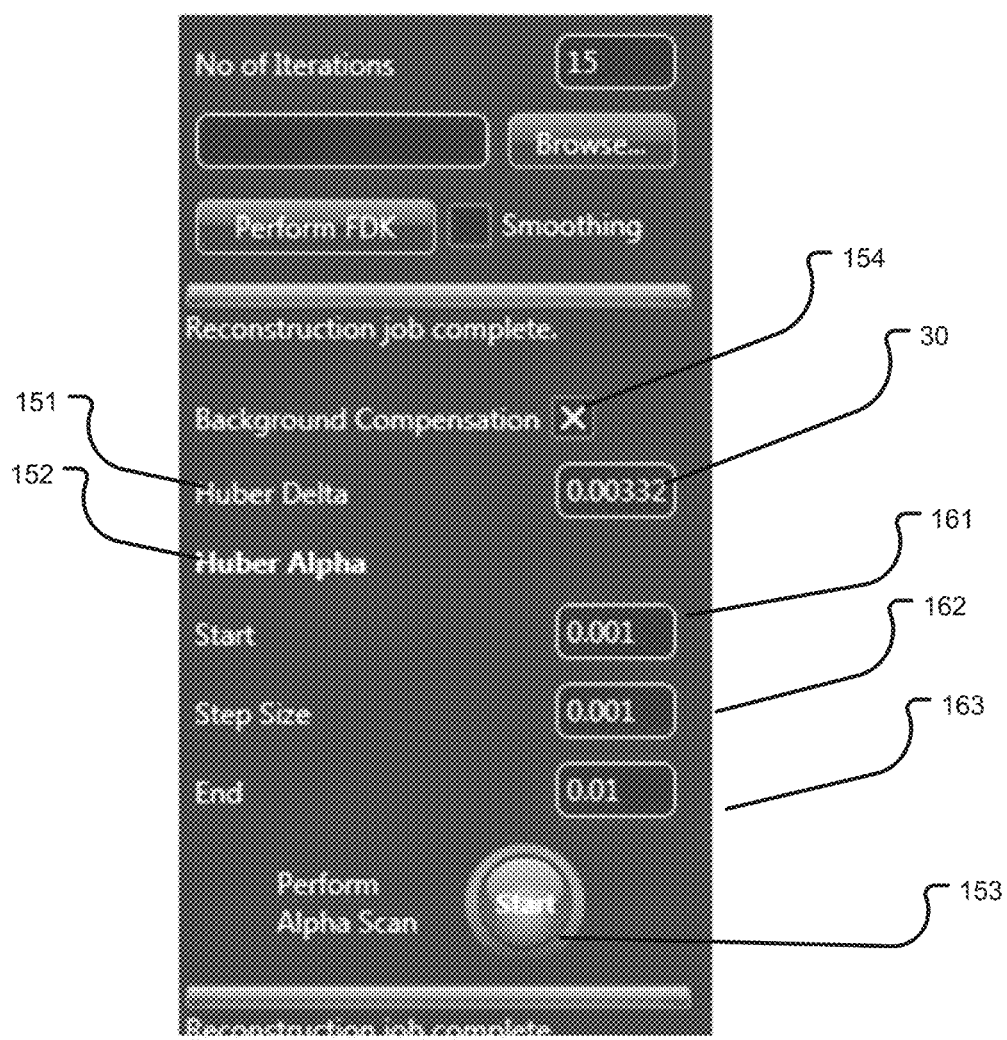
FIG. 20 shows the Intermediate Reconstruction window as in FIG. 18, where a background compensation option is selected for removing certain types of artifacts in subsequent iterative reconstructions.

In FIG. 19B, the slider bar 422 operates in a different mode than in FIG. 9A. Here, the slider bar 422 selects different values for the smoothing parameter 20. The slider bar 422 is currently shown at its furthest (right-most) travel point, which indicates the greatest amount of smoothing/the largest value for the smoothing parameter 20. FIG. 19C shows the right-most position of this slider bar 422 in more detail.

FIG. 21A through 21D illustrate how an operator can move the slider bar 422 to select different smoothing parameters 20. Different positions of the slider bar 422 are shown in each of 21A through 21D, which correspondingly produce different values of the smoothing parameter 20.

Figure 21A:
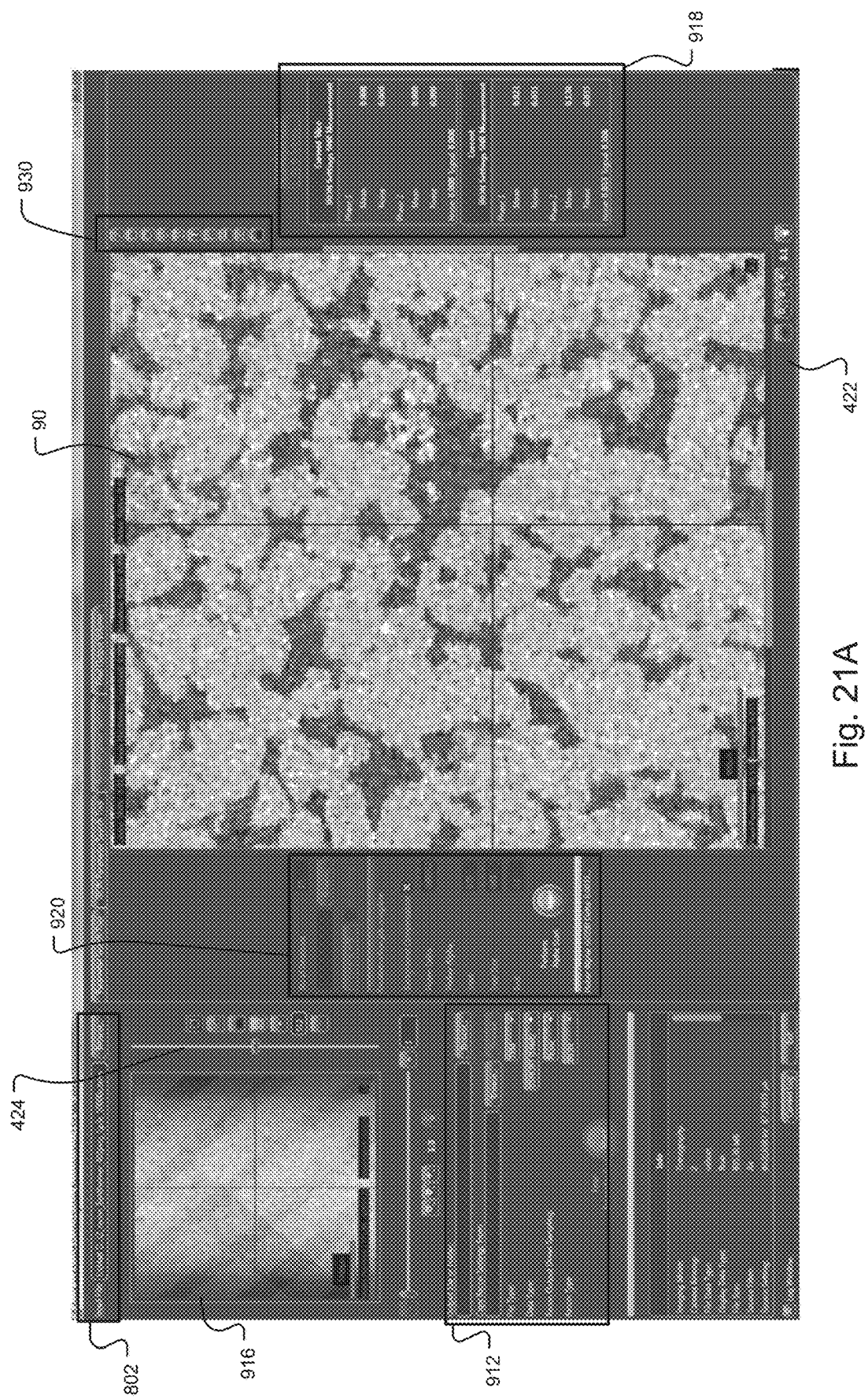
FIG. 21A shows the GUI after executing an iterative reconstruction of the sample, and shows a magnified view of a slice selected from the reconstruction, where the displayed slice indicates that significant noise is present within the reconstruction.

FIG. 21A shows a slice 90 of an under smoothed dataset, with significant noise still present within the reconstruction.

Figure 21B:
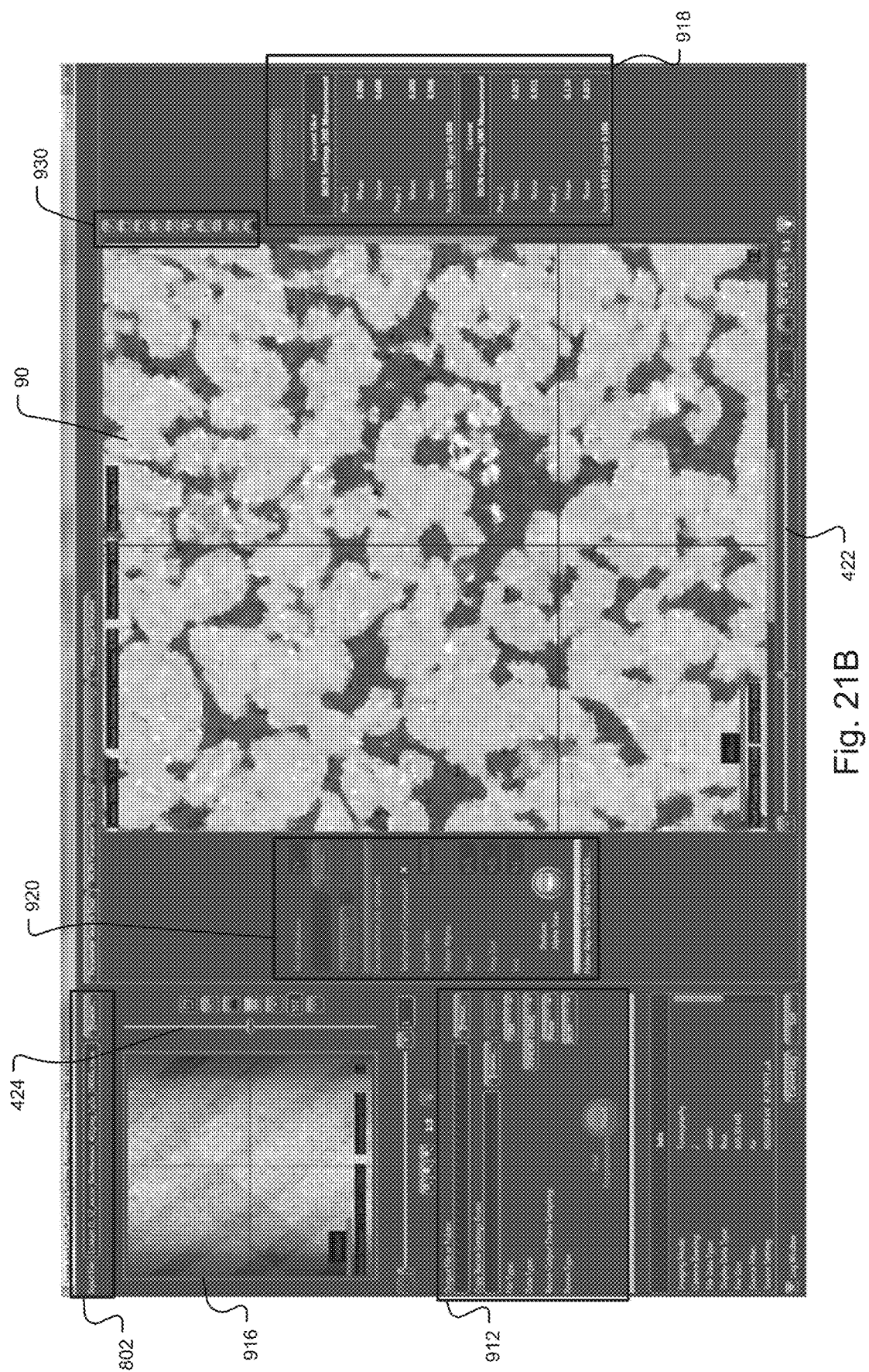
FIG. 21B shows the GUI after executing another iterative reconstruction of the sample, and shows a magnified view of a slice selected from the reconstruction, where the displayed slice indicates that the noise is more limited than that shown in FIG. 21A.

FIG. 21B shows a slice 90 of an dataset having more limited noise than that displayed in FIG. 21. However, "speckles" are still present within the reconstruction. Usually, the best results are found by changing the smoothing value 20 until just after the last speckles of noise in the slice 90 are removed.

Figure 21C:
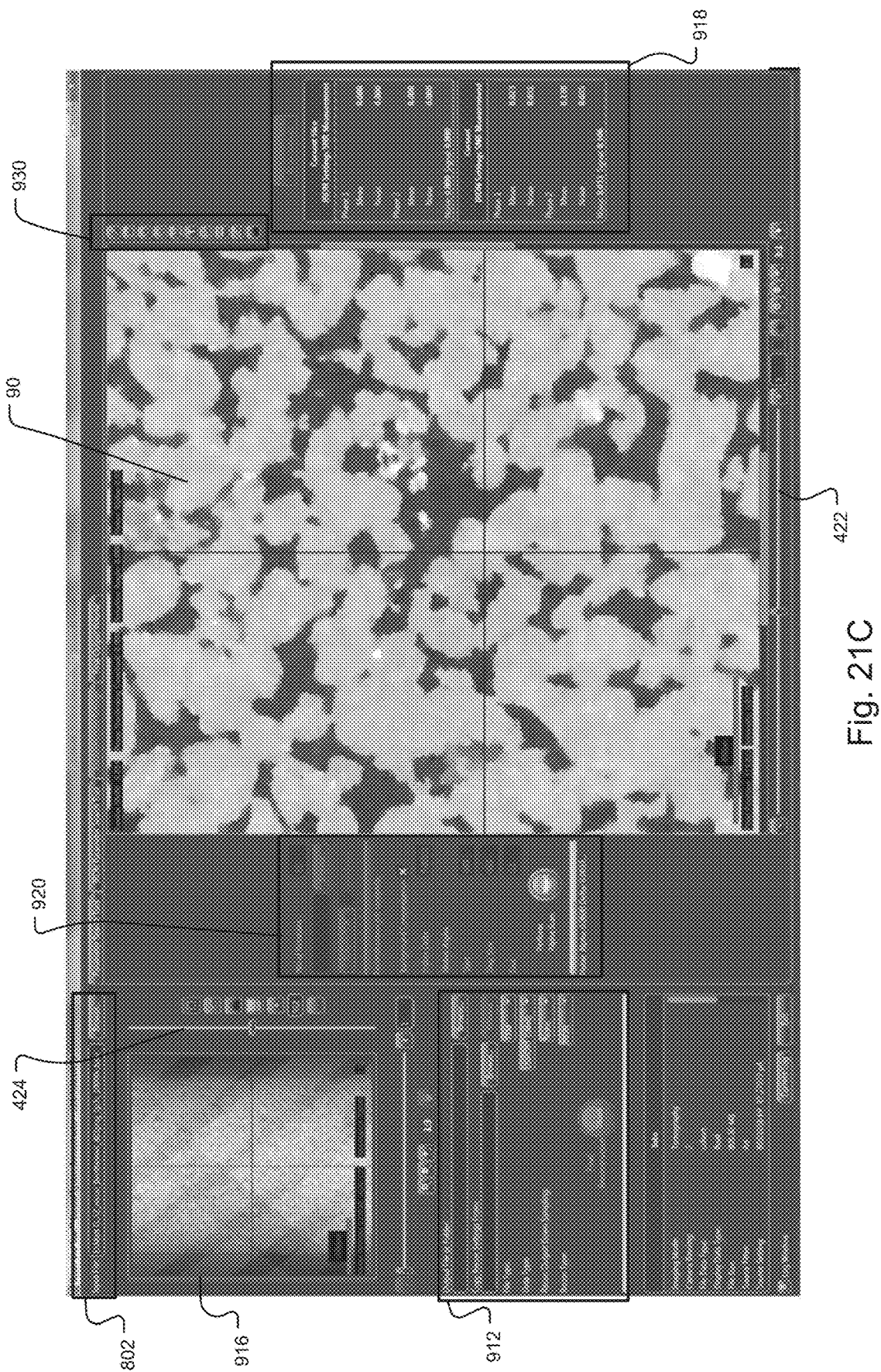
FIG. 21C shows the GUI after executing yet another iterative reconstruction of the sample, and shows a magnified view of a slice selected from the reconstruction, where the displayed slice indicates that noise is removed from the slice.

FIG. 21C shows a slice 90 of a dataset having noise removed. This corresponds to an optimum value for the smoothing parameter 20.

Figure 21D:
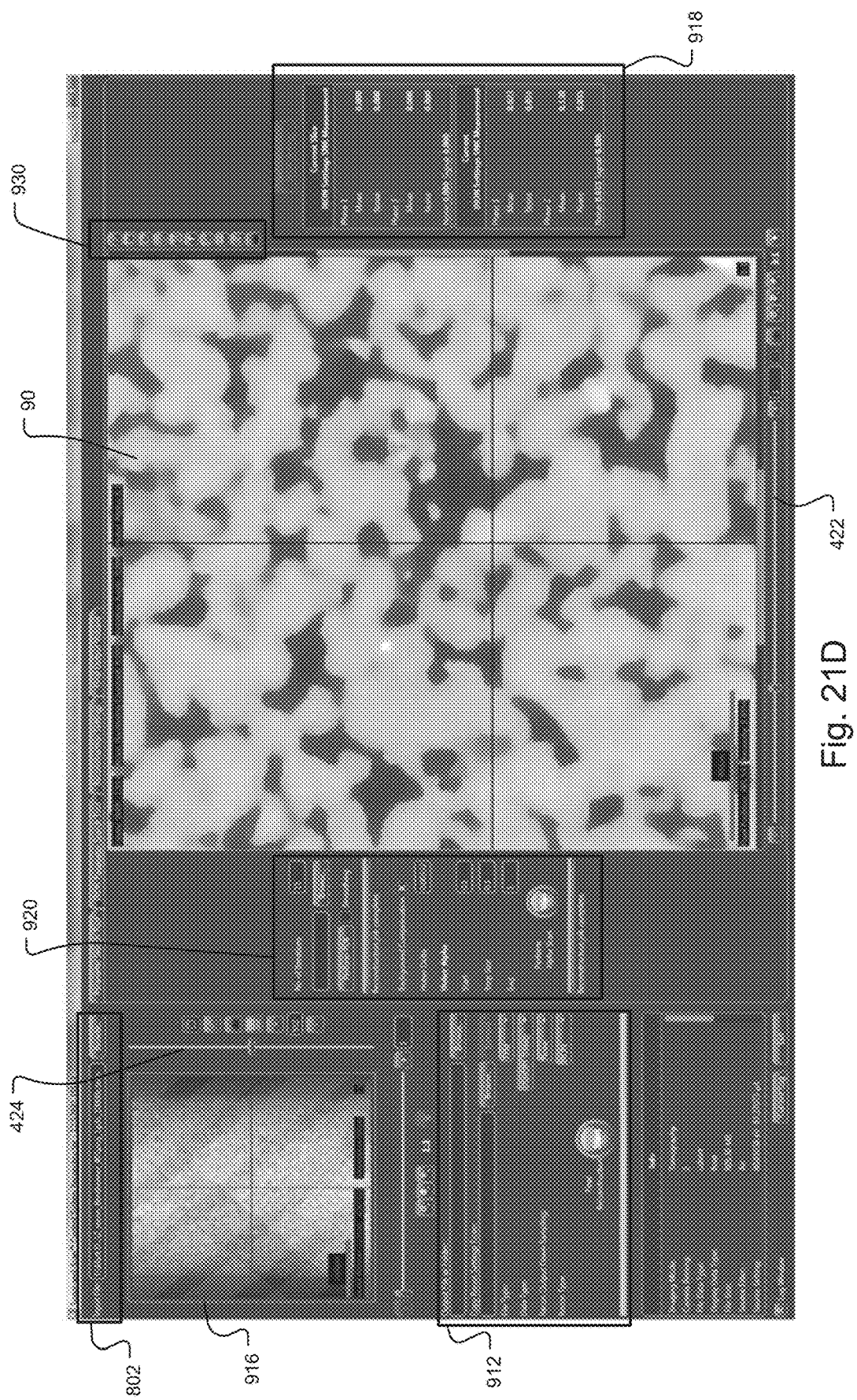
FIG. 21D shows the GUI after executing still another iterative reconstruction of the sample, and shows a magnified view of a slice selected from the reconstruction, where the displayed slice indicates that the smoothing parameter value used during the reconstruction has yielded an "oversmoothed" slice.
Figure 22A:
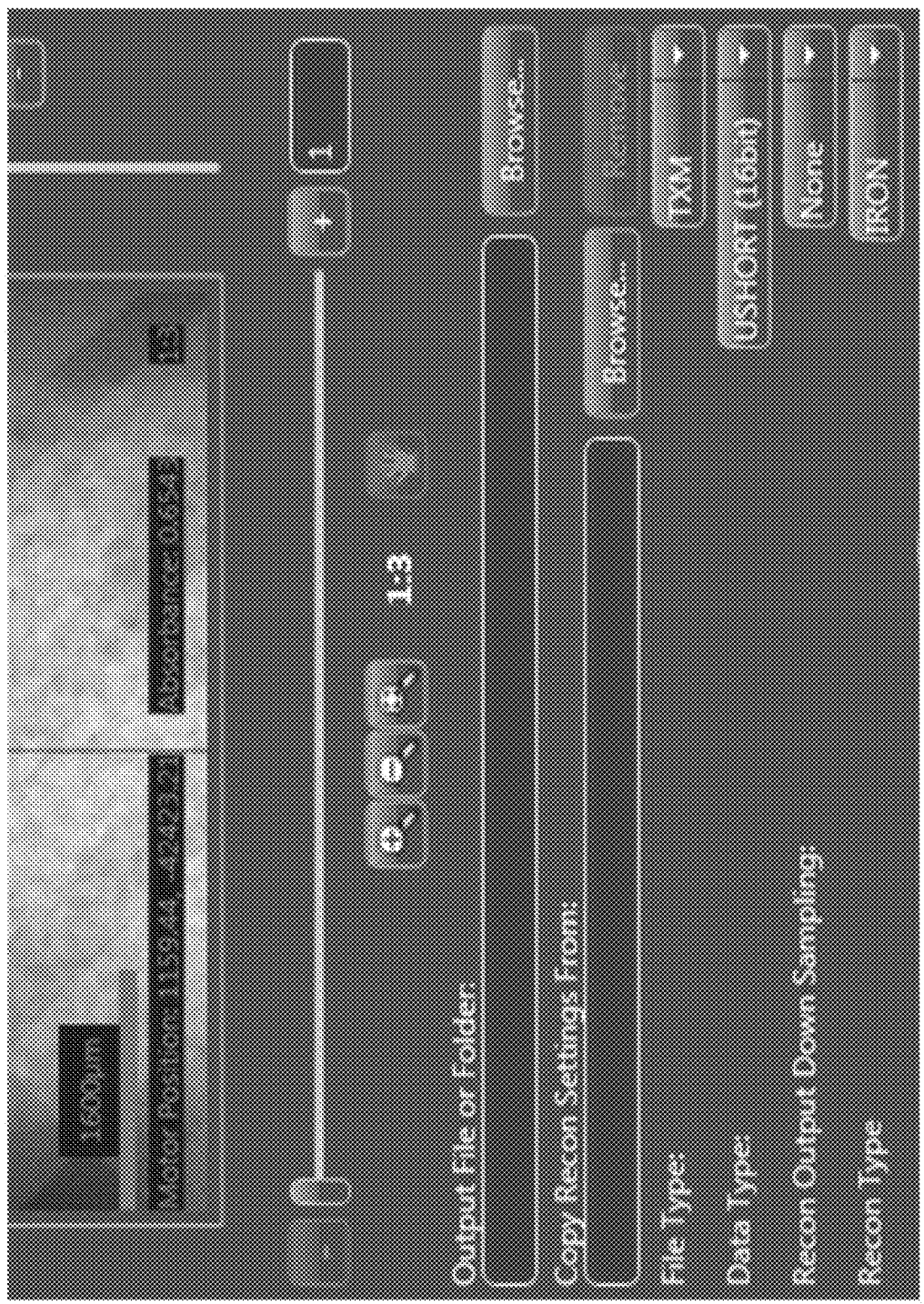
FIG. 22A is a magnified view of the GUI, showing details of a Reconstruction Manager window.
Figure 22B:
FIG. 22B shows more detail for the Reconstruction Manager window, where an operator has used the window to select the projection data of the sample, and where the window is pre-reloaded with the determined regulation parameters required for iterative reconstruction (the corrected center offset, the corrected beam hardening correction constant, the optimized edge preserving cutoff parameter, and the smoothing parameter)
Figure 22C:
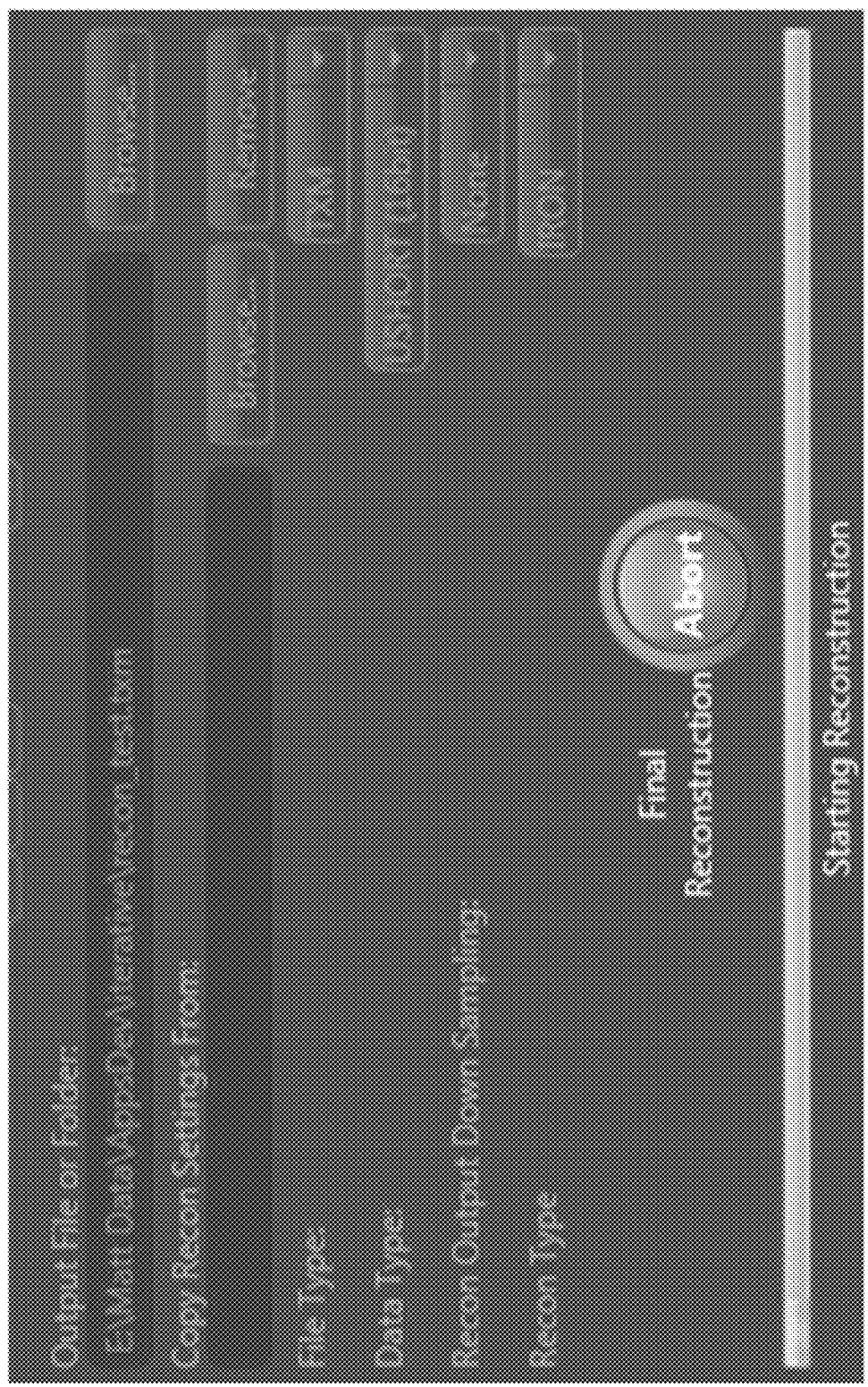
FIG. 22C shows more detail for the Reconstruction Manager window, where an operator has used the window to initiate generation of an iteratively reconstructed volume dataset of the sample, using the determined reconstruction parameters.

FIG. 21D shows a slice 90 of an dataset that is over smoothed. This occurs when the smoothing parameter 20 is too large. Such a value for the smoothing parameter 20 will begin to remove small structures from the reconstruction.

While this invention has been particularly shown and described with references to preferred embodiments thereof, it will be understood by those skilled in the art that various changes in form and details may be made therein without departing from the scope of the invention encompassed by the appended claims.

What is claimed is:

1. An x-ray micro tomography system, comprising:
an x-ray microscopy system including an x-ray source system for generating an x-ray beam, and a detector system for detecting the x-ray beam after transmission through a sample to generate projection data; and
a computer system for executing iterative reconstruction using the projection data by first determining regularization parameters and then executing iterative reconstruction using the projection data;
wherein the computer system estimates image noise from a reconstructed portion of the sample and sets an edge preserving cutoff regularization parameter based on the noise estimate, the edge preserving cutoff regularization parameter being used in the iterative reconstruction using the projection data.

2. The system as claimed in claim 1, wherein the reconstructed portion of the sample is reconstructed using back projection.

3. The system as claimed in claim 1, wherein the noise is estimated within different phases of the sample.

4. The system as claimed in claim 3, wherein the noise is estimated by measuring a standard deviations of pixel greyscales within each of the phases.

5. The system as claimed in claim 1, wherein the computer system reconstructs at least a portion of the sample using iterative reconstruction using different smoothing regularization parameters until a target signal to noise ratio is obtained, the smoothing regularization parameter yielding the target signal to noise ratio being used in the iterative reconstruction using the projection data.

6. The system as claimed in claim 1, wherein the computer system determines a center offset regularization parameter based on a reconstruction of at least a portion of the sample using back projection.

7. The system as claimed in claim 1, wherein the computer system determines a beam hardening correction constant regularization parameter based on a reconstruction of at least a portion of the sample using back projection.

8. The system as claimed in claim 1, wherein the computer system executes iterative reconstruction using the projection data and the determined regularization parameters to generate a volume dataset of the sample.

9. An x-ray micro tomography system, comprising:
an x-ray microscopy system including an x-ray source system for generating an x-ray beam, and a detector system for detecting the x-ray beam after transmission through a sample to generate projection data; and
a computer system for executing iterative reconstruction using the projection data by first determining regularization parameters and performing a setup method to determine a corrected beam hardening correction constant and a corrected center offset based on a reconstruction of at least a portion of the sample using Filtered Back Projection (FBP).

10. The system as claimed in claim 9, wherein the FBP reconstruction is executed on only a portion of the sample.

11. A method for an x-ray micro tomography system, comprising:
generating an x-ray beam;
detecting the x-ray beam after transmission through a sample to generate projection data; and
a computer system executing iterative reconstruction using the projection data by first determining regularization parameters and estimating image noise from a reconstructed portion of the sample and setting an edge preserving cutoff regularization parameter based on the noise estimate, the edge preserving cutoff regularization parameter being used in the iterative reconstruction using the projection data.

12. The method as claimed in claim 11, further comprising reconstructing the reconstructed portion of the sample using back projection.

13. The method as claimed in claim 11, further comprising estimating the noise within different phases of the sample.

14. The method as claimed in claim 11, further comprising reconstructing at least a portion of the sample using iterative reconstruction using different smoothing regularization parameters until a target signal to noise ratio is obtained, and applying the smoothing regularization parameter yielding the target signal to noise ratio for use in the iterative reconstruction using the projection data.

15. The method as claimed in claim 11, further comprising determining a center offset regularization parameter based on a reconstruction of at least a portion of the sample using back projection.

16. The method as claimed in claim 11, further comprising determining a beam hardening correction constant regularization parameter based on a reconstruction of at least a portion of the sample using back projection.

17. The method as claimed in claim 11, further comprising executing iterative reconstruction using the projection data and the determined regularization parameters to generate a volume dataset of the sample.

18. A method for an x-ray micro tomography system, comprising:
generating an x-ray beam;
detecting the x-ray beam after transmission through a sample to generate projection data; and
a computer system executing iterative reconstruction using the projection data by first determining regularization parameters and performing a setup method to determine a corrected beam hardening correction constant and a corrected center offset based on a reconstruction of at least a portion of the sample using Filtered Back Projection (FBP).

* * * * *